United States Patent
Rich et al.

(10) Patent No.: US 6,457,065 B1
(45) Date of Patent: Sep. 24, 2002

(54) TRANSACTION-SCOPED REPLICATION FOR DISTRIBUTED OBJECT SYSTEMS

(75) Inventors: Lawrence Scott Rich; Timo J. Salo, both of Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,093

(22) Filed: Jan. 5, 1999

(51) Int. Cl.[7] .............................................. G06F 9/45
(52) U.S. Cl. .................. 709/328; 709/329; 709/330; 709/101
(58) Field of Search ................. 709/100, 101, 709/102, 103, 104, 316, 328, 329, 330; 717/1, 2, 3, 6; 707/4, 9, 100, 102, 201, 202, 203

(56) References Cited

U.S. PATENT DOCUMENTS

| | | | |
|---|---|---|---|
| 5,095,421 A | 3/1992 | Freund | 395/650 |
| 5,469,562 A | 11/1995 | Saether | 395/182.18 |
| 6,049,807 A * | 4/2000 | Carroll et al. | 707/201 |
| 6,199,195 B1 * | 3/2001 | Goodwin et al. | 717/1 |
| 6,272,488 B1 * | 8/2001 | Chang et al. | 707/4 |
| 6,298,478 B1 * | 10/2001 | Nally et al. | 717/6 |

* cited by examiner

Primary Examiner—Majid Banankhah
(74) Attorney, Agent, or Firm—Gregory M. Doudnikoff; Marcia L. Doubet

(57) ABSTRACT

A method, system, and computer program product for improving the performance of distributed object systems. A remote object is replicated to the node of the distributed system from which it is accessed. The scope of the replication is a transaction. Thereafter, method invocations on the object occur locally, avoiding the performance overhead of frequent round trips to the remote persistent object store. Changes made to a replicated object by a transaction are represented using a tree structure that is internally managed by the application. When an application or application user has made modifications to a replicated object and requests to commit the modifications, a determination is first made as to whether committing the modifications will result in an unacceptable data conflict. If no unacceptable data conflict will occur, and after resolution of those conflicts that can be resolved, the modifications are committed. Nested transactions are supported, where each child transaction may commit or roll back independently.

24 Claims, 14 Drawing Sheets

400

TRANSACTION-SCOPED REPLICATION FOR DISTRIBUTED OBJECT SYSTEMS

RELATED INVENTIONS

U.S. patent application Ser. No. 09/223,986, filed on Dec. 31, 1998, now U.S. Pat. No. 6,298,478 entitled, "Technique for Managing Enterprise JavaBeans™ which are the Target of Multiple Concurrent and/or Nested Transactions"; U.S. Pat. application Ser. No. 09/224,535, filed on Dec. 31, 1 998, entitled "Technique for Managing Associations Between Enterprise JavaBeans™ which are the Target of Multiple Concurrent and/or Nested Transactions"; and U.S. patent application Ser. No. 09/001,980 filed Dec. 31, 1997, entitled "Technique for Managing Objects which are the Target of Multiple Transactions in a Client/Server Environment", the disclosures of which are hereby incorporated by reference.

BACKGROUND OF THE INVENTION

1. Field of the Invention

The present invention relates to the field of computer programming, and more particularly to a technique for replicating objects in distributed object systems to reduce network round trips during program execution and thereby improve system performance.

2. Description of the Related Art

A "distributed object system" is an execution environment in which objects may be located on more than one physical computer and the application programs which operate upon those objects may also be located on (and operating on) more than one computer, where the multiple computers are connected by a network. Distributed object systems may be structured as client/server systems or as multi-tier systems (where a client/server system may be considered a multi-tier system having two tiers). Such systems are well known in the art.

Performance is a significant concern when implementing distributed object systems.

Existing object distribution techniques, such as Enterprise JavaBeans ("EJBs") and the Common Object Request Broker Architecture ("CORBA") are based on a model where the actual remote object instances reside in a server computer and the client nodes hold on to proxies which represent the remote instances in the client computer. ("JavaBeans" is a trademark of Sun Microsystems, Inc. EJBs are described in "Enterprise JavaBeans", hereinafter referred to as the "EJB specification", which was published by Sun Microsystems, Inc. on Mar. 21, 1998. "CORBA" is a registered trademark of Object Management Group, Inc.) The proxies do not contain any business behavior (i.e. executable logic) of the remote objects: they only provide remote interfaces to access the remote objects from applications executing on the client. Therefore, every single method invocation on a proxy held by a client must be immediately passed on from the proxy to the actual remote instance in the server. The message invocation is then carried out on the remote instance at the server, and upon completion a response is returned to the proxy at the client.

FIG. 1 depicts an example of a prior art object system 100 using this object distribution approach. Suppose the system of this example includes objects for employees, their managers, and their addresses. Object server 150 is shown as containing instances of Employee objects 160, Manager objects 170, and Address objects 180. Client application 110 executing in a client device has corresponding proxies (stored either in memory associated with the application, or in other locally-accessible storage) for each object class in use by the application, which in the example are depicted as Employee proxy 120, Manager proxy 130, and Address proxy 140. When the application 110 invokes a method on an Employee object 160, the method invocation is directed locally to the Employee proxy 120, which then forwards 190a a message to the actual remote instance of the Employee object at 160. The method will be executed remotely at server 150. If the method execution causes any updates to the Employee object, these updates are performed on the remote Employee object 160. The response to this message 190a is returned 190b from the Employee object 160 to the Employee proxy 120 for use by the client application 110. Similarly, method invocations on a Manager object 170 or an Address object 180 cause a message 191a or 192a, respectively, to be sent to the corresponding object located on server 150, with response 191b or 192b returned to the appropriate proxy 130 or 140.

Even with applications of moderate size, this requirement for every message and response to be transmitted across a network in this manner results in a significant amount of network traffic. This message traffic is very expensive in terms of computation time because, in addition to the time expended due to network latency, each message has to travel through several service layers and process switches on both ends of the network connection. The service layers involved may include remote name resolution, message creation and formatting, transport, reception, buffering, scheduling, and dispatch. The multiple layers and processes which are involved cause the messaging event itself to be very costly in terms of program execution overhead, regardless of the size of the message. This high expense of remote method invocations makes it very difficult in distributed object systems to fulfill the requirements of object model granularity for which object systems were designed, and to fulfill the performance requirements demanded in modern computing environments (including large-scale enterprise computing and electronic commerce systems).

Accordingly, what is needed is a technique for reducing the performance overhead, and thereby improving performance, in distributed object systems which require remote method invocation for object access.

SUMMARY OF THE INVENTION

An object of the present invention is to provide a technique for reducing performance overhead in distributed object systems.

Another object of the present invention is to provide this technique by replicating remote objects to the local system(s) which access the objects.

Yet another object of the present invention is to provide this technique where the scope of the replication is a transaction.

A further object of the present invention is to provide this technique whereby transactions are used to ensure consistency and integrity of a replicated object among multiple applications and/or users that may access the object.

Still another object of the present invention is to provide this technique whereby each subtransaction within a transaction may have an independent view of a replicated object.

Yet another object of the present invention is to provide this technique in a manner that appropriately isolates changes made to a replicated object by one or more transactions occurring in the distributed object system, as well as changes made by multiple subtransactions within a transaction.

Still another object of the invention is to provide a technique for implementing a transaction management subsystem which is optimized for replication of remote objects.

Another object of the invention is to detect data conflicts when a user or application attempts to commit changes to a replicated object in a persistent data store.

A further object of the invention is to resolve data conflicts, where possible, after they have been detected.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for improving performance in a distributed object system. This technique comprises: creating a tree structure to represent one or more subtransactions of one or more concurrent and/or nested transactions which may access one or more objects stored at a remote persistent object store in the distributed object system, wherein each node of the tree structure maintains an independent view comprising a version of each object available at this node; requesting, by a selected one of the subtransactions, access to a selected one of the stored objects; determining whether the selected object is available in a particular independent view maintained by a node in which the selected subtransaction is executing; obtaining a version of the selected object and making the obtained version available to the particular independent view when the determining has a negative result; temporarily making one or more modifications to the selected object, the modifications requested by the selected subtransaction, by making the modifications to the particular independent view of the selected subtransaction; committing the modifications upon a commit request; and performing a rollback of the modifications upon a rollback request.

Obtaining a version of the selected object and making the obtained version available may further comprise: checking whether the selected subtransaction is a remote transaction; copying the version of the selected object from an ancestor node when the checking has a negative result; and replicating the version of the selected object from a remote parent node when the checking has a positive result.

The copying may further comprise: retrieving the selected object from the remote persistent object store when the selected object is not available in the independent view of any ancestor node of the selected subtransaction in the tree structure, thereby making the selected object available from the independent view of a particular one of the ancestor nodes; copying the selected object down through the tree structure to the selected subtransaction from the independent view of the ancestor node in which the selected object is available; and adding the retrieved object to the particular independent view of the selected subtransaction.

The replicating may further comprise: retrieving the selected object from the remote persistent object store when the selected object is not available in the independent view of the remote parent node or the independent view of any ancestor node of the selected subtransaction in the tree structure, thereby making the selected object available from the independent view of a particular one of the ancestor nodes; copying the selected object down through the tree structure to the remote parent node of the selected subtransaction from the independent view of the ancestor in which the selected object is available; rendering the selected object into a portable format at the remote parent node; transmitting the portable format from the remote parent node to the node in which the selected subtransaction is executing; receiving the transmitted portable format and reconstituting the selected object from the portable format at the node in which the selected subtransaction is executing; and adding the reconstituted selected object to the particular independent view of the selected subtransaction.

The committing may further comprise: performing a commit when the subtransaction is not a top-level transaction in a transaction tree, or performing the commit when the subtransaction is the top-level transaction in the transaction tree.

In one aspect, the first case may further comprise: attempting to merge the modifications to the parent of the subtransaction upon the request to commit the modifications; cancelling the commit request if the attempting process detects one or more unresolvable data conflicts with one or more separate modifications made to the selected object, wherein the separate modifications are stored by the parent in the independent view of the parent; performing the merge of the modifications to the independent view of the parent if the attempting process does not detect any of the unresolvable data conflicts; and committing the merged modifications to the independent view of the parent. The second case further comprises: committing the modifications with a copy of the selected object in the remote persistent object store; merging the modifications to a global transaction if the committing process does not detect an error condition; and discarding the top-level transaction and any subtransactions related to the top-level transaction in the transaction tree.

In another aspect, the first case may further comprise: attempting to merge the modifications to the parent of the subtransaction upon a request to commit the modifications; cancelling the commit request if the attempting process detects one or more unresolvable data conflicts with one or more separate modifications made to the selected object, wherein the separate modifications are stored by the parent in the independent view of the parent; performing the merge of the modifications to the independent view of the parent if the attempting process does not detect any of the unresolvable data conflicts; and committing the merged modifications to the independent view of the parent. The second case further comprises: committing the modifications with a copy of the selected object in the remote persistent object store; and discarding the top-level transaction and any subtransactions related to the top-level transaction in the transaction tree.

The attempting process may further comprise invoking application-specific logic to determine when the separate modifications indicate that one of the unresolvable data conflicts is found, and the merging may further comprise invoking application-specific logic to resolve any resolvable data conflicts.

Or, the attempting process may further comprise determining that no unresolvable data conflict will occur if one of an object version from a child transaction and a parent transaction which are to be merged has not been modified or where both of the object versions have been modified from the child transaction and the parent transaction, logic is applied that determines that the object versions can be successfully merged; and wherein performing the merging further comprises invoking application-specific logic to resolve any resolvable data conflicts.

The present invention will now be described with reference to the following drawings, in which like reference numbers denote the same element throughout.

DESCRIPTION OF THE PREFERRED EMBODIMENT

Figure 2:
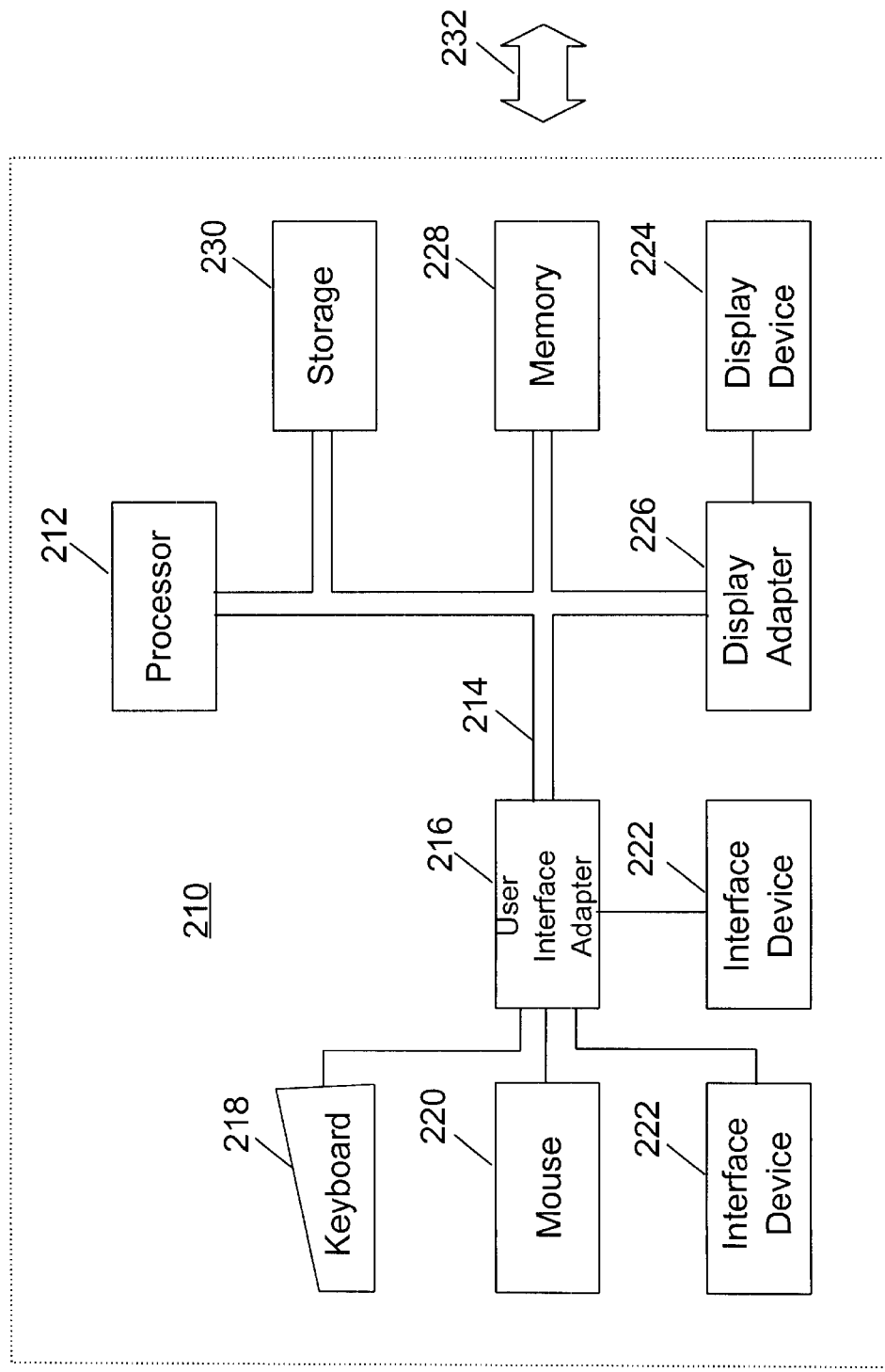
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Figure 3:
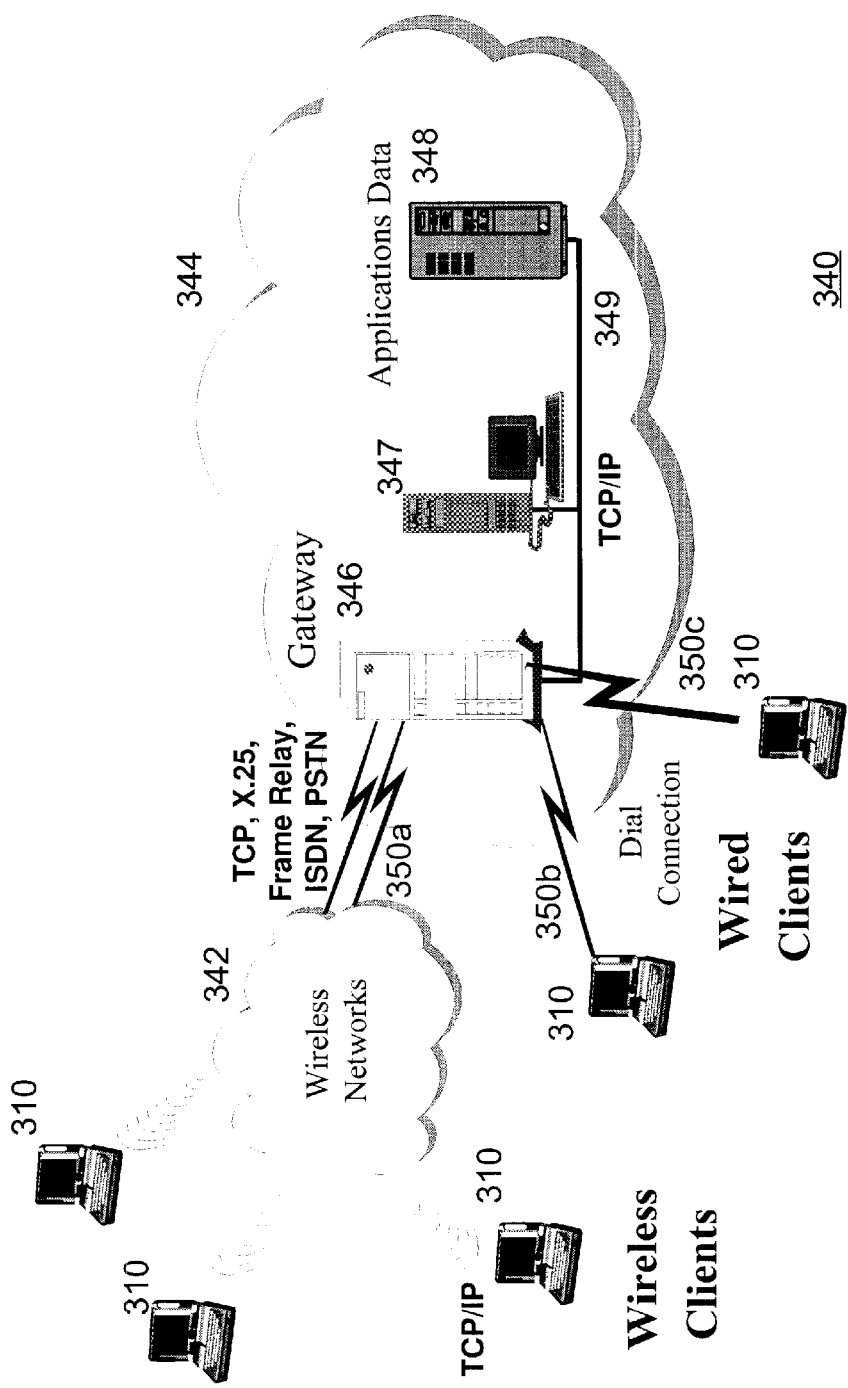
FIG. 3 is a diagram of a networked computing environment in which the present invention may be practiced.

FIG. 3 illustrates a data processing network 340 in which the present invention may be practiced. The data processing network 340 may include a plurality of individual networks, such as wireless network 342 and network 344, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 342 and 344 may also include mainframe computers or servers, such as a gateway computer 346 or application server 347 (which may access a data repository 348). A gateway computer 346 serves as a point of entry into each network 344. The gateway 346 may be preferably coupled to another network 342 by means of a communications link 350a. The gateway 346 may also be directly coupled to one or more workstations 210 using a communications link 350b, 350c. The gateway computer 346 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 346 may also be coupled 349 to a storage device (such as data repository 348). Further, the gateway 346 may be directly or indirectly coupled to one or more workstations 210.

Those skilled in the art will appreciate that the gateway computer 346 may be located a great geographic distance from the network 342, and similarly, the workstations 210 may be located a substantial distance from the networks 342 and 344. For example, the network 342 may be located in California, while the gateway 346 may be located in Texas, and one or more of the workstations 210 may be located in New York. The workstations 210 may connect to the wireless network 342 using a networking protocol such as the Transmission Control Protocol/Internet Protocol ("TCP/IP") over a number of alternative connection media, such as cellular phone, radio frequency networks, satellite networks, etc. The wireless network 342 preferably connects to the gateway 346 using a network connection 350a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 346 using dial connections 350b or 350c. Further, the wireless network 342 and network 344 may connect to one or more other networks (not shown), in an analogous manner to that depicted in FIG. 3.

Software programming code which embodies the present invention is typically accessed by the microprocessor 212 of the workstation 210 or server 347 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, or a multi-tiered architecture.

In the preferred embodiment, the present invention is implemented as a computer software program. The program code of the preferred embodiment is implemented as objects (classes and methods) in the Java object-oriented programming language. ("Java" is a trademark of Sun Microsystems, Inc.) However, other programming languages that enable access to remote objects may be used equivalently, without deviating from the inventive concepts disclosed herein.

The present invention defines a remote object replication technique that eliminates the need to transfer high numbers of messages for object access across a network. This technique comprises replicating a copy of the remote objects needed within the scope of a transaction to the client node(s) which access the object(s), and managing these replicated versions. This technique enables efficient local access to objects by using the replicated versions, and is especially beneficial for fine-grained object access. ("Fine-grained" object access refers to accessing relatively small objects, such as when an object model has been designed to use separate objects for an employee, his manager, and his address as described with reference to FIG. 1. Providing this type of granularity in an object model is desirable for optimizing the benefits of using an object-oriented system. Fine-grained access is contrasted to "coarse-grained" object access which refers to accessing relatively large objects, such as might occur if all information for an employee, his manager, and his address were contained within a single object.)

According to the present invention, the scope of the replication is a transaction. What constitutes a transaction is an application-dependent decision. Using commonly-known industry terms, a transaction represents a logical group of changes to one or more objects that will be performed in an atomic manner (that is, either all operations within the transaction are performed, or none of them are performed). U.S. patent application Ser. No. 09/001,980, titled "Technique for Managing Objects which are the Target of Multiple Transactions in a Client/Server Environment" (hereinafter, "the first related invention"), defines a technique for using a transactional approach to maintain consistency in updating objects, where the tasks a user (or application program) performs are organized into transactions. Using the transactional approach defined in this first related invention, all changes that the user wants to make to an object within the scope of a transaction are made first to an internal copy (called a "version") of the object, without actually updating the persistent, stored object itself. The user eventually decides whether to permanently commit the changes encompassed by the transaction, or whether to discard them. If the user chooses to commit, then the updated object in the version is copied to the persistent store. If the user chooses to discard (or "roll back") the changes, the persistent store is left unchanged. (The concept of a persistent store is well known, and will not be described in detail herein. In a client/server or multi-tiered environment, a persistent store of objects may be maintained in one or more locations which are accessible by applications in the computing environment, such as one or more common databases. Such databases may be maintained in, for example, the data repository 348 of FIG. 3 or the long term storage 230 of FIG. 2.)

The technique defined in this first related invention enables nested transactions to have views of an object that are completely independent from the views of other concurrent transactions. However, this first related invention does not solve the performance problem of high message traffic and overhead that arises due to remote method invocation in distributed object systems.

Applying the technique of object versioning combined with transactions to EJBs, and the particular changes required for managing EJBs with this technique, was disclosed in U.S. patent application Ser. No. 9/224,535 "Technique for Managing Enterprise JavaBeans™ which are the Target of Multiple Concurrent and/or Nested Transactions" (hereinafter, "the second related invention"). Enterprise JavaBeans were defined for use in an enterprise computing environment, and provide access to remotely-stored objects during development and deployment. EJBs are similar to JavaBeans, where "JavaBean" is a term used in Java programming to refer to one or more classes (i.e. code which represents a combination of logic function and data), and where one or more JavaBeans are combined to form an application. JavaBeans are intended to execute locally, within the Java Virtual Machine ("JVM") on which a Java application is running. EJBs, on the other hand, are intended to execute on a server in a distributed object system. (EJBs an d Java programming are well known to those skilled in the art, and will not be discussed in depth herein.)

According to the second related invention, each transaction is provided with its own version of each EJB that it accesses, and these versions are maintained in a view for the transaction. Each subtransaction within a transaction may further have its own view of the EJB, if that transaction or its children accesses the EJB. Furthermore, the data represented in one subtransaction's view for a particular EJB may be different from the data represented in another subtransaction's view within the same transaction. However, this second related invention also does not solve the performance problem of high message traffic and overhead due to remote method invocation in distributed object systems, as the operations defined therein are still required to use client proxies which access remotely-stored versions of EJBs.

The present invention will now be described in detail with reference to FIGS. 4 through 13.

Distributed computer systems form networks of nodes, where each node may act as both a client and a server to the other nodes. According to the present invention, a transaction may span multiple nodes of an "n"-tiered distributed network (that is, a network having an arbitrary number of tiers), thus allowing for efficient replication in large scale computing environments. Or, a transaction may exist within a single network node. The logical transaction model for a replicated distributed object system, as defined by the present invention, forms a tree of nested transactions. A physical node may have nodes of transaction trees for multiple transactions, and may be a parent for some transactions while being a child for other transactions. The present invention uses these nested transaction trees to manage changes to the replicas, as well as actual changes to the remote objects in the persistent store, resulting from one or more concurrent and/or nested transactions. (Note that the present invention may be used in a computing system specifically designed for use with the present invention, or it may be used in a more general transactional system by making appropriate modifications to the code executing on the server and client nodes.)

The nested transaction trees used by the present invention may be of an arbitrary depth, and the nodes of the transaction tree may span multiple nodes of the distributed object system, as required by a particular nested transaction. A nested transaction is one where the transaction is logically viewed as a tree, each subtree being either nested or flat. Nested transaction subtrees are internal nodes within the tree structure, and flat transactions are leaf nodes of the tree. The root of a transaction is called the "top-level transaction"; nodes below this top level are called "child transactions" or "subtransactions". A transaction's predecessor node in the tree is called a "parent" and nodes below that transaction in the tree are called "child" nodes, using the terminology for tree structures that is commonly known in the computer programming art. Within a particular node of the distributed object system, a root transaction may be either a top-level transaction (that is, a transaction begun within this particular node) or it may be a child of a transaction in its immediate parent node (in which case it is a root of a subtransaction), as will be further illustrated below with reference to FIGS. 4A and 4B. Transactions within a node of the distributed object system can be both parent and children of the transactions in other nodes.

Figure 4A:
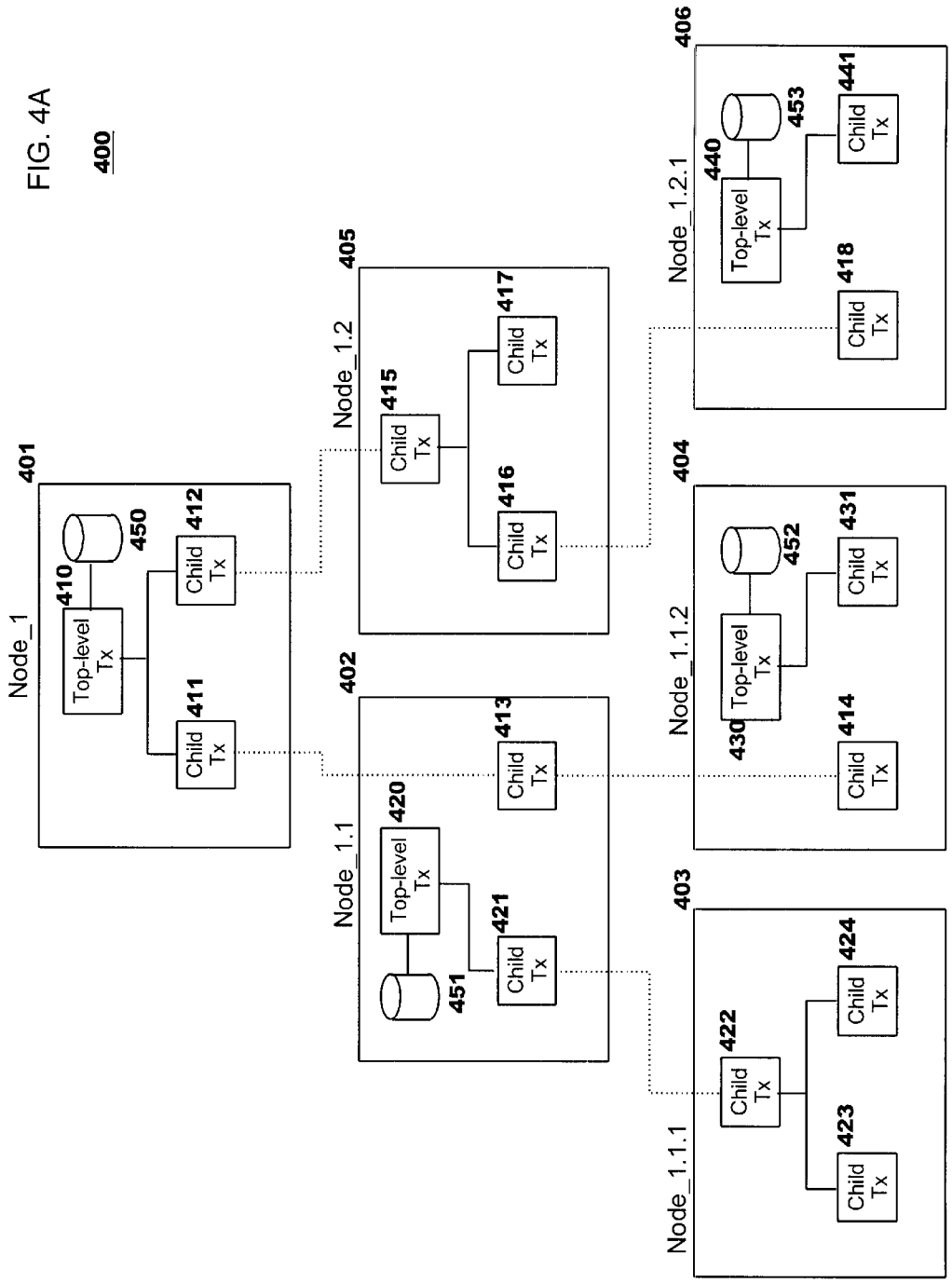
FIGS. 4A and 4B illustrate transactions involving distributed objects where the transactions span multiple nodes of a distributed object system, according to the present invention.

An example configuration of a distributed object system 400 having six nodes with four transactions spanning various ones of these six nodes according to the present invention is depicted in FIG. 4A. This example configuration accesses (and therefore replicates) objects stored in four separate repositories 450, 451, 452, and 453 (which may be considered as four additional server nodes of the distributed object system). Node_(element 401) is a parent of a transaction 410 which has two child nodes 411, 412 in the local node. The child 411 then has a child 413 (i.e. a child transaction) in Node_1.1, which has its own child 414 in Node_1.1.2. The child 412 has a child 415 at Node_1.2, where this node 415 has two children 416 and 417. Child 416 also has a child 418 at Node_1.2.1. Thus, transaction 410 spans five of the six physical nodes of this example distributed object system 400, and is up to five levels deep (following the path between elements 410, 412, 415, 416, and 418). Transaction 420 has its root at Node_1.1 402, and also has child node 421 at Node_1.1 and descendent nodes 422, 423, 424 at Node_1.1.1 403. Transaction 430 of the example is located only on Node 1.1.2 404, and Transaction 440 is located only on Node_1.2.1 406. Note that while these four example transactions are shown as following the same hierarchy, this is for purposes of illustration and not of limitation. For example, Node_1.1.1 403 might be a parent to a transaction having its next lower level at Node_1.2 405, followed by a next lower level at Node_401.

Figure 1:
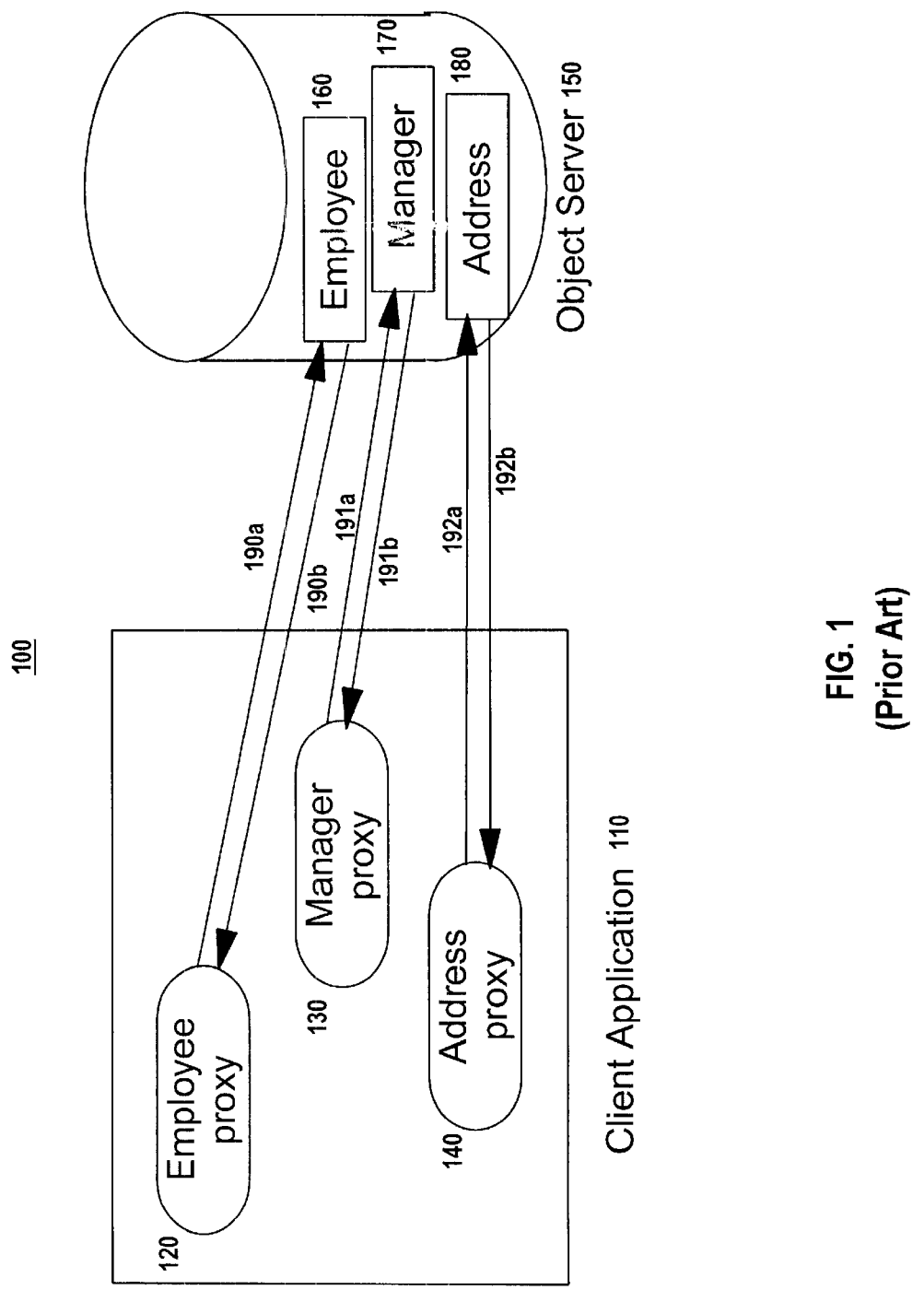
FIG. 1 depicts a simple example of a distributed object system of the prior art.

As an example of using the present invention for transactions which span multiple nodes of an object system, suppose the distributed object system includes the Employee, Manager, and Address objects previously described with reference to FIG. 1 and also Department objects and Division objects (where the underlying object model for a Division comprises multiple Departments and each Department has one Manager and one or more Employees). The objects for this model may be stored in one global repository, or they may be dispersed across multiple physical storage locations. Suppose a copy of the objects are stored in a global repository 450 at Node_1 401, and the departmental servers (such as Node_1.1 402 and Node_1.2 403) also have a replicated copy of the objects for a first department and a second department, respectively. The present invention may be used to manage the consistency of these replicated copies with the global repository. Further suppose a manager wishes to view and possibly update objects related to the employees in his department. The manager may be using a client workstation such as Node_1.1.1 403. The manager then, according to the present invention, replicates a copy of the Employee object (and perhaps their Address objects as well) for each of his employees from departmental server 402 to his client workstation 403. An employee in this manager's department may, at the same time, wish to view and possibly update his own employee or address information. The employee may be using a client workstation such as Node_1.1.2 404. The employee replicates a copy of his own Employee or Address object from departmental server 402 to his client workstation 404. Using the techniques of the present invention, as will be described in detail below, the integrity and consistency of any common objects that are replicated from departmental server 402 for the work being done by the manager at workstation 403 and for the work being done by the employee at workstation 404 are automatically and transparently maintained. Furthermore, the integrity and consistency of these replicated objects is automatically and transparently maintained with respect to the remote objects at global repository 401, from which the copies were replicated.

As an alternative to representing an n-tiered distributed network, a nested transaction tree may represent multiple tasks occurring on a relatively small number of systems or even on a single system. For example, a single user workstation may create a multi-level transaction tree, such as transaction 430 or 440 of FIG. 4A. This can be easily understood with reference to graphical user interface, or "GUI"-based, applications. In such applications, windows are often opened within windows, where each window may constitute a separate transaction or a child transaction. (The details of a particular application will determine where the boundary for a new transaction lies, as stated previously.) For example, suppose an enterprise application provides call center support for a business having a large number of customers, and the application user is a person who handles calls from these customers. The application will most likely provide some type of "main window", where the user typically begins accessing the application services for each new call. This main window may be used to enter the customer's name or identification number ("ID"), for example. Detailed information about the customer's account may then be accessible through a number of subsequent windows that may be accessed after first entering the customer's name or ID into the main window. A logical way to structure the flow within such an application is to treat each customer's processing as a separate transaction. The subsequent windows opened for a customer's records may then be treated as child transactions. One user of this application may be able to handle more than one call at a time (by putting customers on hold temporarily, for example), and start the processing for each new caller (and therefore a new transaction) while windows are already open for the earlier callers. In this example, a window opened for a first caller may be the top-level transaction node 430 of the transaction tree, which has objects replicated from repository 452. Node 431 represents a subsequent window opened for this same caller. Additional nodes might then be added to transaction tree 430, 431 depending on the user's traversal through the application. Additional transaction trees similar to tree 430, 431 would be opened for each additional caller.

These are examples of the manner in which one or more concurrent and/or nested transactions may span one or more nodes of a distributed object system, where the present invention uses a nested transaction tree for maintaining the integrity and consistency of the replicated objects used within the transactions (as will be described in detail herein).

Transactions whose parent resides in a different node of the distributed object system consist of two components: the "server transaction" in the parent node and the "client transaction" in the child node. This is illustrated by the example in FIG. 4B, where node 460 has the top-level transaction 470 and two children 471, 472 which are siblings. Child transaction 471 is designated as a "server child transaction", because it has a child transaction 473 (which is designated as a "client child transaction") on client node 462. Client child transaction 473 then has two children 474, 475 in this example. A root node of a client transaction (such as node 473) serves as the parent transaction for the scope of the client node, but is a child of the server transaction (such as node 471). A reference to a parent transaction in a remote node is called a "transaction proxy".

Using this nested transaction tree structure, the present invention replicates remote objects from a parent node to a child node during a transaction, and merges the replicas back to the parent upon the transaction being committed. During a transaction each method invocation between objects therefore happens locally within the client node using the client's replica, thus eliminating the need to pass each invocation to the remote server. The message traffic when using this replication technique therefore consists of relatively few messages, as contrasted to the prior art, which are sent when replicating objects to the client node and when merging the modified replicas back to the persistent store at a server node.

Within the scope of a nested transaction, a child transaction at any level may either commit its changes or roll them back. If the child transaction commits, its versions of replicated remote objects (including any changed values therein) are merged to its parent transaction. The change does not actually update the remote object instance at the persistent store unless and until the top-level transaction is committed. Further, the changes are not visible to any siblings of the committed child transaction, or to any nodes other than the parent (such as child transactions that are siblings of this parent), until the changes propagate upward through the tree by commits at higher-level nodes. (This enables the manager and employee working at different workstations 403, 404, as described above, to work independently with consistent data values that do not change due to changes made concurrently by other users.) If a child transaction rolls back, then the changes made by this child and all its children are discarded, without updating the remote object.

When receiving a commit request, a child transaction first tests to see if its replicated versions of remote objects can be merged to its parent. The default test is that if a version of the the same node (as shown by child transaction nodes 411 and 412 of FIG. 4A, for example).

When a remote object is first accessed (using, for example, a find method or a get/set property method) within a nested transaction in the child node, a new version of the object is added to the current transaction. The new version is based on the version in the parent transaction. If the parent transaction does not contain a version of the object, the parent will first create a version for itself based on its parent. If the remote object eventually cannot be located in the child node's root transaction (which is a client transaction), the request is forwarded to the corresponding server transaction in the parent node.

The first-time access within the server transaction in the parent node causes a new version of the remote object to be registered into the transaction. As in the child node, the new version is based on the version in the server transaction's parent. Once the new version has been registered into the server transaction, the version is serialized and replicated to the child node. In the child node, the version is de-serialized and registered into the current client transaction and returned to the application.

A node can commit any transaction in its transaction tree, including the proxy transactions. When a commit request is sent to a transaction, the transaction requests its immediate child transactions to commit (which will then request their children to commit, etc.). Therefore, the leaf transactions commit first, then their parents, and finally the root transaction. This means that a child node can merge all its object versions to a parent node by committing the same object has been modified in both the parent and child transactions, the versions cannot be merged because the results may be unpredictable. Application-dependent logic may be used to replace this default test with a conflict resolution method for the replicated versions of particular objects. In either case, if the test fails then the transaction will roll back (and the child transaction's versions will simply be dropped).

When the root of a transaction tree in a client node (such as element 422 in FIG. 4A or element 473 in FIG. 4B) is committed, the replicated object versions that were modified or created by this client transaction are serialized and sent back to the server transaction (such as 421 of FIG. 4A or 471 of FIG. 4B, respectively) in the parent node. (References herein to serializing an object are intended to mean that an object is rendered in a portable format which can be used by another node to reconstitute the object, where this reconstituting process is referred to herein as de-serializing. Java serialization methods are one manner in which this may be performed, although other techniques may be used without deviating from the scope of the present invention.) The server transaction is then committed following the technique which has been described above for committing a child transaction.

A node can begin a child transaction for any transaction in its immediate parent by requesting a parent transaction proxy (that is, a proxy in the node which is used to communicate with the parent transaction) to begin a child transaction. If the parent does not have a transaction, the child node can create such by requesting an ancestor transaction proxy to begin a child transaction in the parent node. A node can also begin child transactions whose parents reside in child's root transactions. Also, a parent node's child nodes can be merged to the parent by committing the parent node's root transactions. All object versions within a tree of nodes can be merged to the root node by committing the top-level transactions in the root node.

A technique for isolating changes to objects between transactions, and between various nodes of a single nested transaction, is described in the first related invention. This first related invention makes use of an optional optimization strategy that minimizes the number of round-trips that are required from the application to the data store. This optimization is accomplished using a single "global transaction", also referred to as a "shared transaction". This shared transaction is defined as being read-only from the perspective of the application program. One such shared transaction exists in each application that uses the technique of this first related invention to provide independent views within nested transactions. (A "view" may conceptually be thought as what the application "sees" as the current representation of information.) When a top-level transaction commits its changes, a copy of the updated object is stored in the view for this shared transaction, as well as updating the remote object instance in the persistent store. Storing an updated copy on the shared transaction's view enables subsequent transactions within the application to efficiently have access to the updated object (that is, by accessing the locally-stored copy in the shared transaction), without the requirement of retrieving the updated copy from the persistent store (which would require the overhead processing of a round-trip to the data store).

Figure 5:
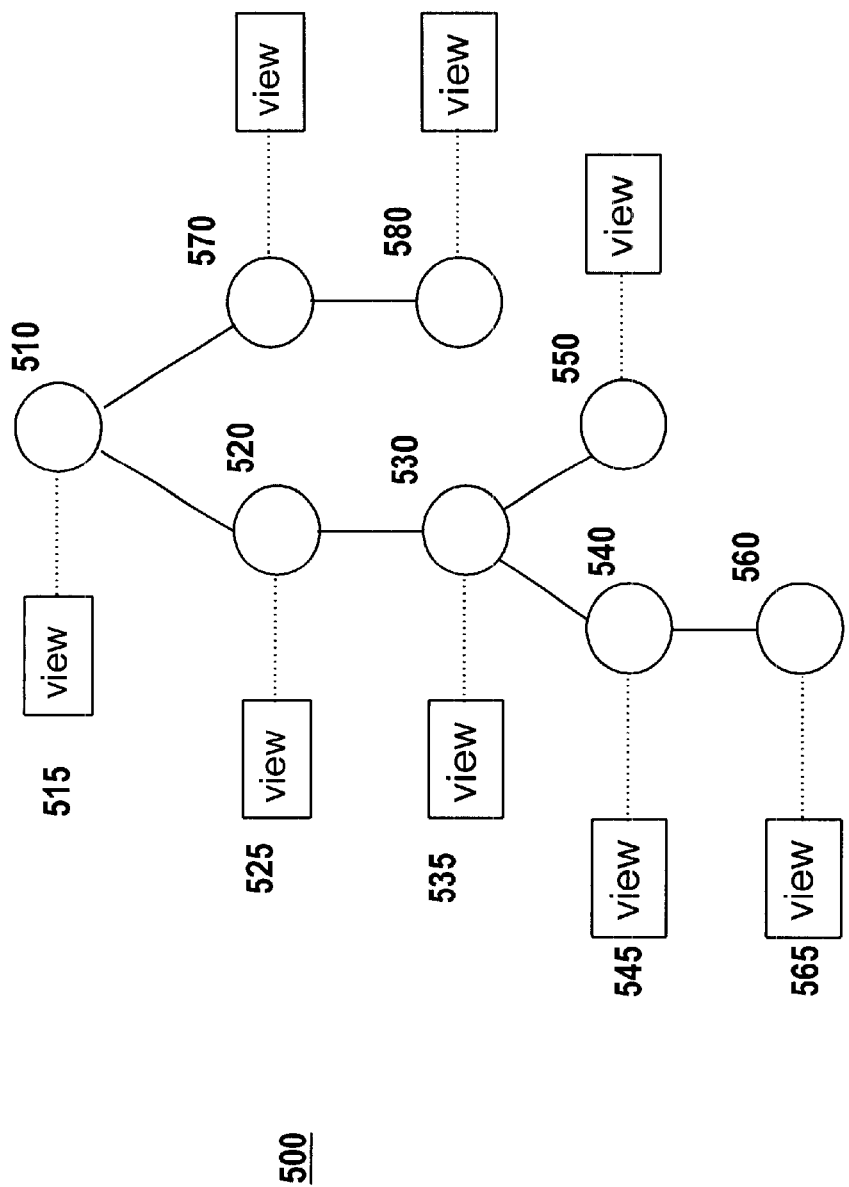
FIG. 5 illustrates a nested transaction hierarchy and views of transactions within an application program, which is used for replicated objects in accordance with the present invention.

FIG. 5 illustrates a transaction tree 500 with which multiple nested transactions may be managed according to the approach and structure defined in the first related invention. A shared transaction 510 is provided at the top of the tree. One such shared transaction exists at all times within an application using the present invention when this optional optimization is implemented. (Otherwise, when this optimization is not used, each top-level transaction has a separate tree structure.) This shared transaction 510 is shown in FIG. 5 as being the parent transaction for two child transactions 520 and 570. Both transactions 520 and 570 are top-level transactions. Within the type of complex business application typically found in an enterprise computing environment, there may be many more than two top-level transactions: two are used in FIG. 5 for illustrative purposes only. Whenever a new top-level transaction is created within the application, it becomes a child of the shared transaction 510. When a top-level transaction completes by either committing or rolling back, it is removed from the transaction tree 500, so that the shared transaction 510 has one less child. The subtree structures shown in FIG. 5 beneath the two top-level transactions (comprising nodes 530 through 560, and 580 respectively) are also for purposes of illustration only. Subtrees correspond to the child transactions within a transaction as previously stated, and thus may be nested to an arbitrary depth, with an arbitrary width, or there may be no subtrees beneath a top-level transaction. The tree structure depicted in FIG. 5 was used in the first related invention for managing transactions on objects.

Figure 4B:
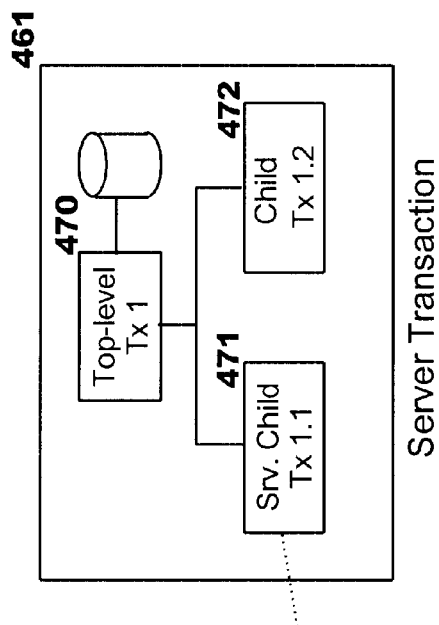
Figure 4B:
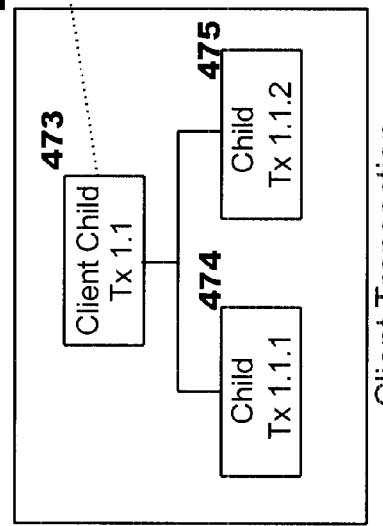

This same structure is used in the present invention (where the shared transaction concept remains an optional optimization) to represent replicated objects for transactions that may span multiple physical nodes (as described with reference to FIGS. 4A and 4B). Views are used by the present invention, where the information an application sees in a view is the current representation of a transaction's replicated objects. FIG. 5 illustrates the fact that each transaction and subtransaction has a view logically associated therewith. For example, the top-level transaction 510 has a view 515 associated therewith; the subtransaction 520 has a view 525 associated therewith, etc. This view concept applies equivalently to transactions spanning multiple physical nodes, as described with reference to FIGS. 4A and 4B (where each component 471, 473 of a transaction spanning multiple nodes has its own view). Thus by providing each transaction, and each subtransaction (when appropriate), its own view of a replicated object, each transaction and subtransaction is able to see a completely independent representation of the replicated object that is isolated from any other transaction and subtransaction. In this manner, actions performed relative to a replicated object can be isolated to the transaction or subtransaction performing the actions. Similarly, if a transaction or subtransaction is cancelled, any modifications made to the replicated objects being used are cancelled along with modifications made by any child transactions, yet any changes made by a higher-level subtransaction in the transaction do not have to also be cancelled.

The present invention uses versioning of replicated objects to provide these independent views within the scope of a transaction. According to this approach, multiple versions of a replicated object may be used internally in an application program; each transaction and subtransaction may then have independent versions of a replicated object to represent the changes made by that transaction or subtransaction. These multiple internal versions are managed using views, where each transaction and subtransaction may have its own view of a replicated object.

Figure 6:
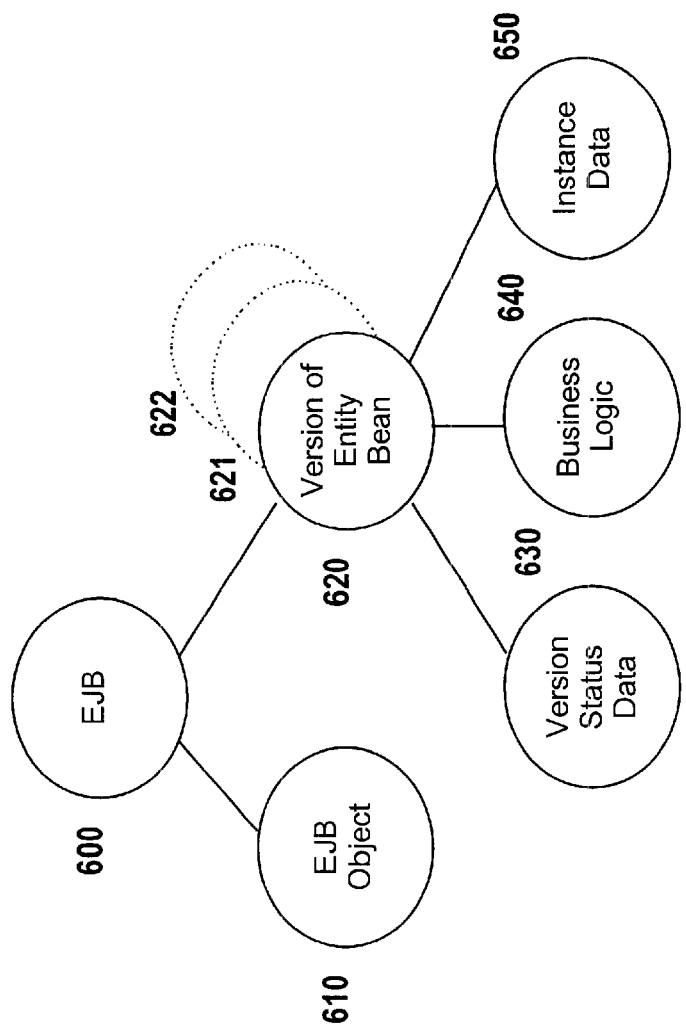
FIG. 6 illustrates the logical partitioning of an EJB into an EJB Object and an entity Bean, and the logical structure that may be used to replicate versions of an entity Bean in a transaction view used with the present invention.

While the present invention applies in general to any distributed object system, it is particularly advantageous for use with EJBs. In an object-oriented environment, each transaction carries out its function by accessing objects such as instances of classes, which, as discussed above, are a combination of logic and data. Data and logic in an EJB which needs to be manipulated by an application is maintained in what may be referred to as "business objects". In the present invention, each view includes a local copy of a subset of the business objects, the subset comprising those business objects which are active for the transaction currently being performed. The EJB specification divides EJBs logically into two parts: an EJB Object, and an entity Bean. FIG. 6 shows how these elements are logically structured, where an EJB 600 is partitioned into an EJB Object 610 and a version 620 of an entity Bean. The EJB Object 610 functions as a wrapper for the EJB. A single EJB Object 610 is created by the container for each application that accesses an EJB. The EJB specification states that the logic or behavior 640 of the EJB, and the instance data 650 for a particular instance of the EJB, are both in the version 620. Version status data 630 is added as another logical substructure to each version 620, beyond what is specified in the EJB specification, according to the second related invention. This version status data 630 is used internally to keep track of information about this version's status, such as whether the version has been modified. Each time a method in the logic 640 of the bean changes the bean version (i.e. the instance data 650 for the version), this version status data 630 stores the knowledge that the bean has been modified in order to later communicate this information upward in the transaction tree 500 upon a commit (so that the root transaction will detect that the changes must be reflected in persistent storage). When the present invention is used with replicated objects other than replicated EJBs, version status data is maintained in a logical association with the version of each of such objects in an analogous manner. Version status data is described in more detail in the following paragraphs.

The version status used by the present invention includes information as to whether the replicated object has been newly created by an application ("state=new") or was read from a database or data store ("state=old"), and whether the version has been marked for deletion ("delete=[yes|no]"). If the version is marked as "delete=yes", this status is promoted upward throughout the transaction tree upon a commit so that a delete command can be issued to the persistent store when the top-level transaction commits. In the preferred embodiment of the present invention, an optimistic conflict resolution scheme is used (although other techniques such as concurrency access locks may be used without deviating from the scope of the present invention). In the optimistic scheme described herein, the version status data also includes a "modified" flag that is used to synchronize the versions internally (within the transaction tree), and an "external synchronization" flag that indicates whether the version needs to be synchronized with the persistent store. This external synchronization flag is set to "yes" whenever a version of a replicated object is changed. Also, a modification level or number is maintained for each version. The modification level of a version in a child is compared with the modification level in its parent when determining whether a merge will be successful. A preferred embodiment for implementing this modification level handling is described herein, but alternative techniques enabling the same end result may be used equivalently. When a version is first created for a replicated object, its modification level is set to zero to indicate that no modifications have been made. Each subsequent modification by the transaction having this version causes the modification level to be incremented. When a version is copied to a child, the child version maintains 2 modification levels: the version its parent had at the time of the copy, and the child's modification level (which is initially set to the same value as the parent's version, and then incremented within the child transaction.) A version of a replicated object may be referenced by an application (i.e. used in read-only mode), or it may be changed by the application (i.e. used in a read-write mode). When a version of a replicated object has not been changed, the version status data will include a "modified= no" flag; otherwise, the flag will be set to "modified=yes". (While values of flags are described here using text, it will be obvious to one of ordinary skill in the art that an implementation will preferably treat these values as binary data.)

The manner in which a preferred embodiment of the present invention may be implemented will now be described with reference to FIGS. 7 through 13. In the discussion of these figures, the term "transaction" will be used to refer to top-level transactions as well as child transactions (subtransactions) and the shared transaction, unless otherwise indicated. This is because traversal of the transaction tree is being discussed, and it will be obvious from the context when top-level transactions (i.e. those with no parent other than the shared transaction) are being referenced, and when the shared transaction has been reached. (Tests as to whether a transaction has a parent include the shared transaction in this discussion, so that top-level transactions are considered as having a parent. The logic of the flowcharts applies equally when the shared transaction concept is not implemented, in which case top-level transactions do not have a parent.)

Figure 7:
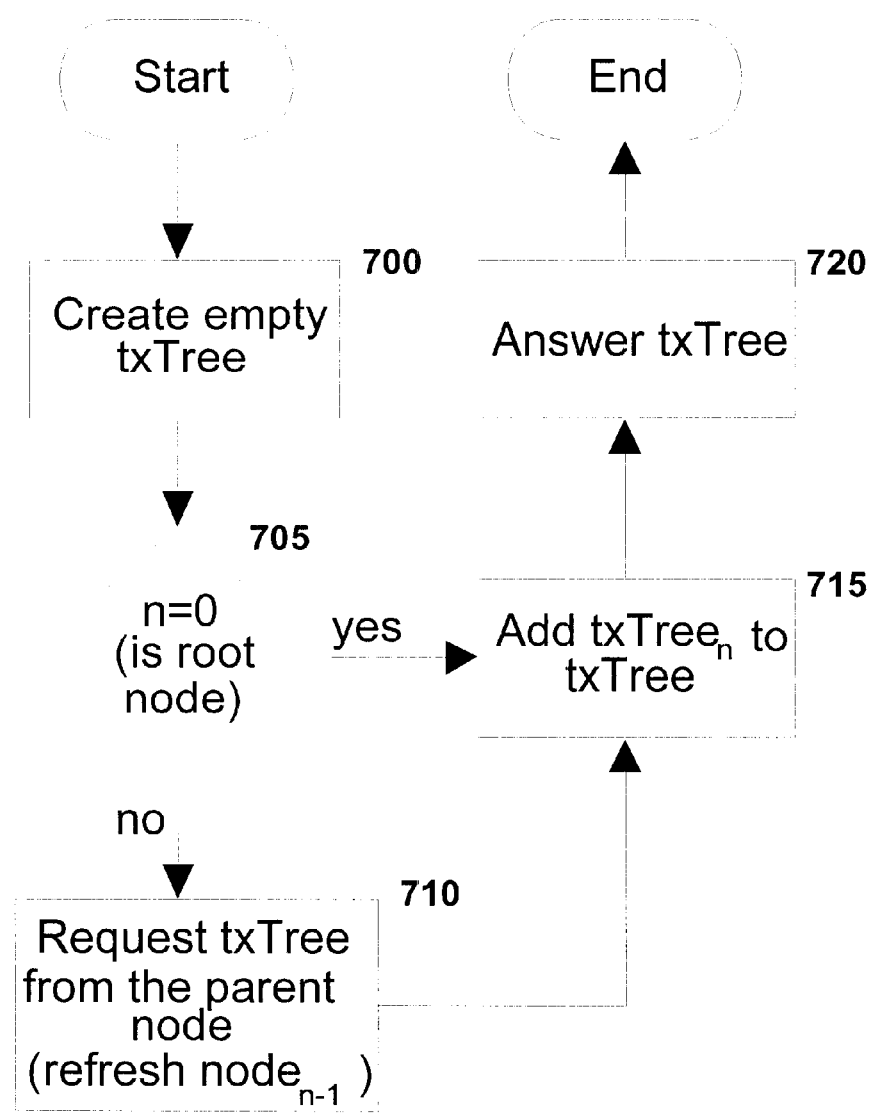
FIGS. 7 through 13 provide flowcharts illustrating the logic with which a preferred embodiment of the present invention may be implemented.

FIG. 7 depicts processing that is invoked by a child node when it initially begins operation according to the present invention. A child node needs a representation or proxy for the transactions occurring in its ancestor nodes. According to the present invention, this proxy may be very lightweight, and comprises at least knowing that there is a parent transaction and how to communicate with that parent. This logic is preferably invoked again when the child node begins a new transaction, to account for new transactions that may have begun in an ancestor after this child node was initialized. In addition, this logic may be invoked periodically, if desired, using application-specific invocation criteria.

The processing of FIG. 7 begins at Block 700, where an empty transaction tree "txTree" is created for a child node referred to as "$node_n$". Block 705 then tests to see if this child node is a root node. If not, then Block 710 recursively invokes the logic of FIG. 7 to perform a refresh of each of the child's ancestor nodes' transaction trees, after which control passes to Block 715. If this child node was a root node, control passes directly from Block 705 to Block 715.

Upon reaching Block 715, txTree will be empty if this node is a root node, and it will represent the transaction trees of this node's ancestors otherwise. Block 715 then adds this node's own transactions, referred to in FIG. 7 as "$txTree_n$", to the txTree structure. Block 720 returns this updated txTree structure to the invoking logic, and the processing of FIG. 7 ends.

Figure 8:
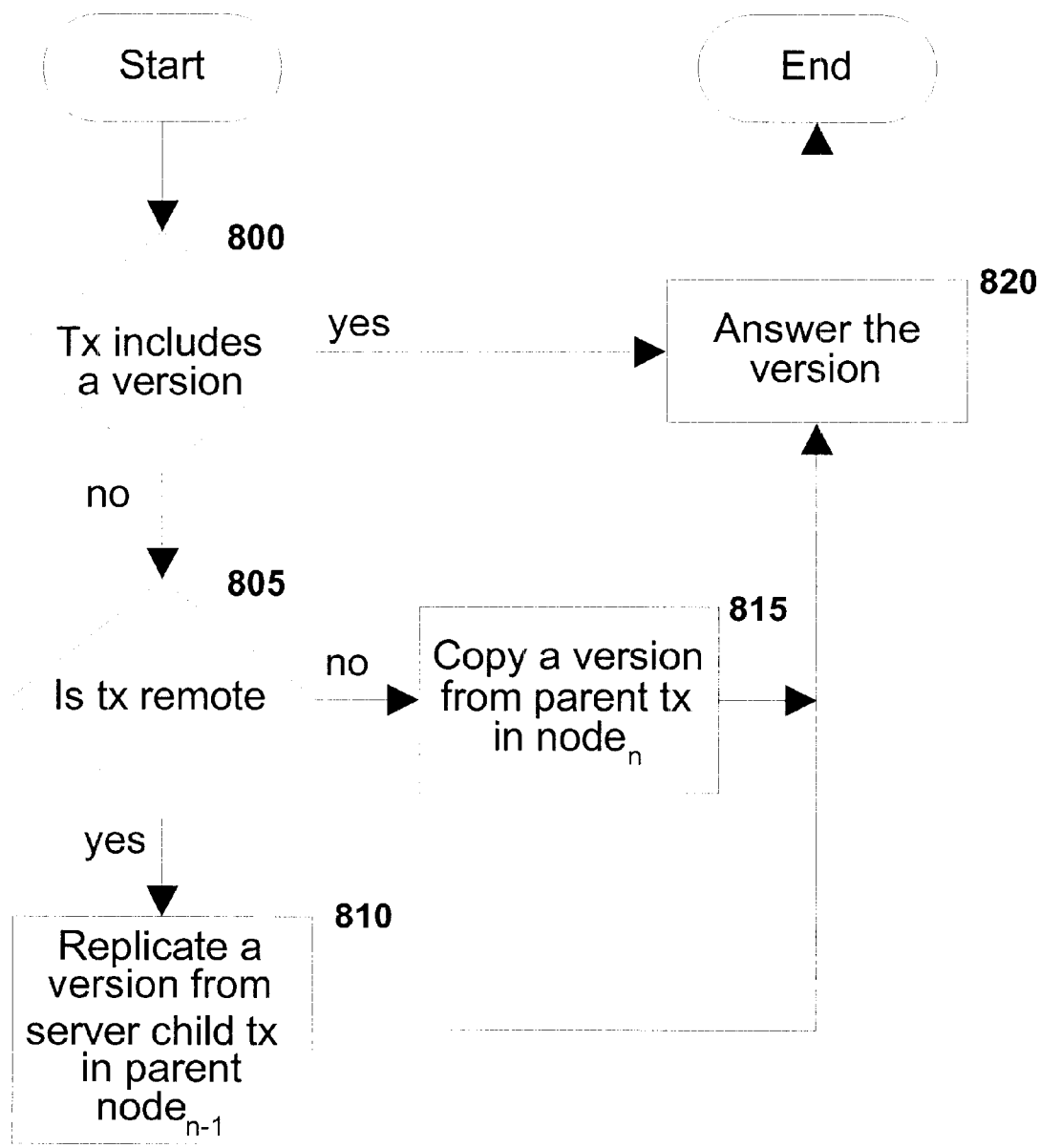

FIG. 8 depicts the logic that may be used to access a version of a replicated object within a transaction. Processing begins at Block 800, in which it is determined if the current transaction's view (referred to in FIG. 8 as "tx") already has a version of the object. If the test in Block 800 has a positive response, processing proceeds to Block 820, where the version from this transaction's view is returned to the invoking logic. The processing of FIG. 8 then ends for this access request.

However, if it is found in Block 800 that a version of the object is not already present in the view for this transaction, then processing proceeds to Block 805. Block 805 asks whether this transaction is remote—that is, whether it is of the form depicted in FIG. 4B. If not, Block 815 causes a copy of the requested object to be obtained from the parent transaction in this node, as further described in FIG. 9. This copied version is then returned to the invoking logic at Block 820. When Block 805 has a positive result, however, Block 810 causes a version of the requested object to be replicated to the current node (as a client child transaction, such as client child transaction 473 in FIG. 4B) from the server child transaction (such as server child transaction 471 in FIG. 4B) in this node's parent node. This replication process comprises performing the logic of FIG. 9 in the parent node to obtain a copy of the requested object, and then serializing this copy and transmitting it to the child node, where it is de-serialized and registered into the transaction on the child node. (Note that the manner in which a serialized object is transmitted over a network connection does not form part of the present invention.) Block 820 then returns this newly-created version to the invoking logic.

Accesses to a version of an object preferably set (as appropriate) the "modified" flag, "delete" flag, and "external synchronization" flag described earlier when changes are made to the version, and increment the modification level associated with the version. In this manner, the merge and commit procedures are optimized. (For example, by using the external synchronization flag, objects that have been accessed only in read mode do not need to be committed to the persistent store, thereby increasing the efficiency of the commit procedure.) However, use of these flags may be omitted without deviating from the inventive concepts disclosed herein, in which case all objects accessed by a transaction participate in the merge and commit of the transaction. (Merge and commit procedures are described in more detail below with reference to FIGS. 12 and 13.)

Figure 9:
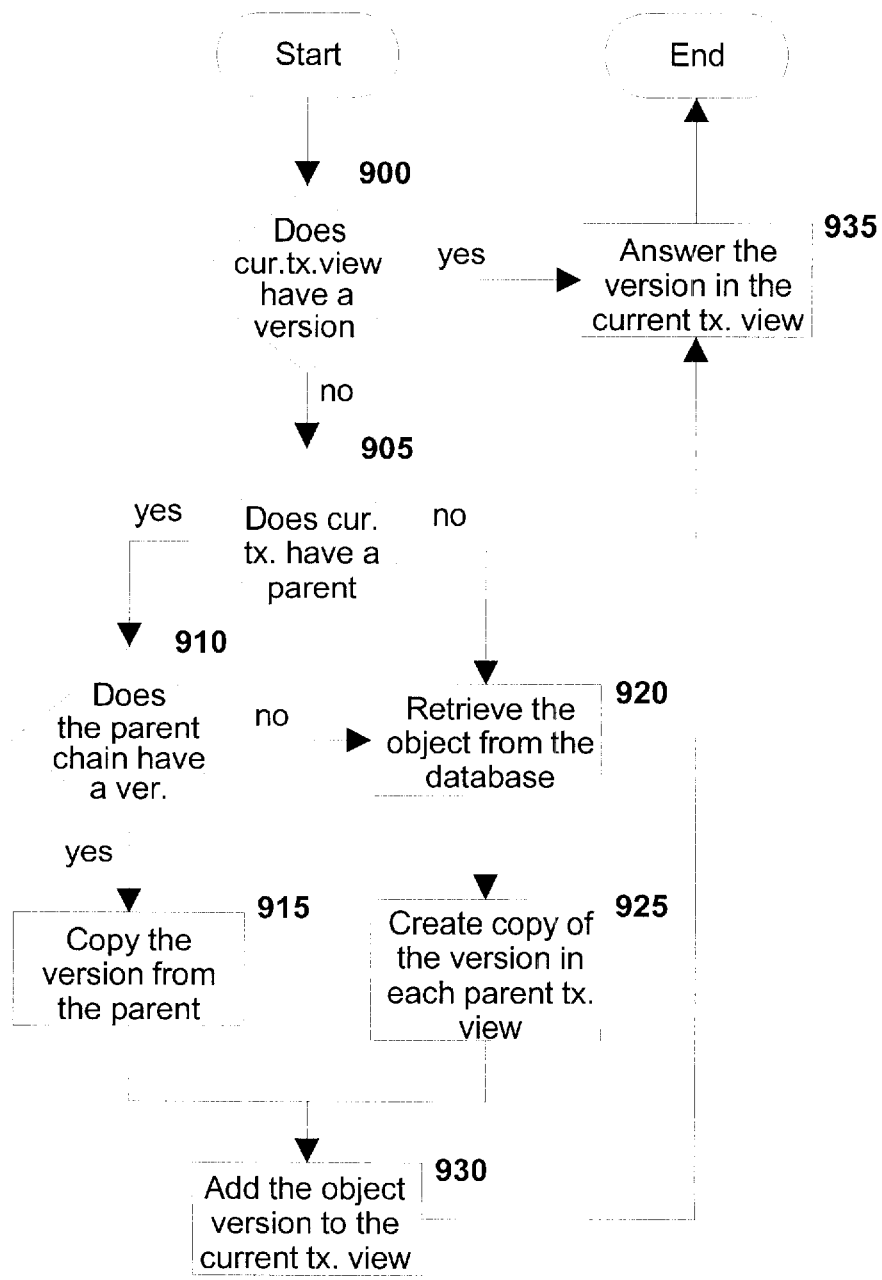

FIG. 9 depicts the logic that may be used to find a version of an object for use by a transaction. Block 900 asks whether the current transaction's view has a version of the requested object. If so, then Block 935 returns this version to the invoking logic, and the processing of FIG. 9 ends. Otherwise, Blocks 905 through 930 are used to locate a version of the object.

Block 905 checks whether the current transaction has a parent. If it does, then Block 910 checks to see if the parent has a version of the requested object, or if any ancestor in the chain which includes the parent has a version. A requesting transaction may be at the end of a long chain of parent transactions, in which case Block 910 will successively check each ancestor higher in the chain until reaching the top-level transaction (or the shared transaction, when this option is used). This technique of checking for a version within the current transaction's tree is performed by the transaction management system according to the present invention to prevent an application from having two different versions of the same object in the same nested transaction chain, where those versions were separately replicated from the persistent store (thus raising the potential for inconsistent results). If the test at Block 910 has a positive result (i.e. a version was located somewhere in the current transaction's ancestors), the version is copied down to any intermediate views between the current transaction and the ancestor where the version was found at Block 915. During this copying process, the state value ("new" or "old") and the external synchronization flag from the existing version are copied into each new version being created, and the modified and delete flags are set to "no" in each new version. The modification levels are set as described above, being copied from the modification level of the version from which the copy is being made. Block 930 then adds the object version to the current transaction's view by copying the state value, external synchronization flag, and the modified and delete flags from the current transaction's parent version. The modification level for the child, and the modification level it remembers for its parent, are set to the current modification level from the parent. Control then transfers to Block 935, where this newly-copied version in the current transaction's view is returned to the invoking logic.

If it is found in Block 910 that a version of the requested object is not present in the view of any ancestor in the parent transaction chain, or if Block 905 determines that there is no parent for the current transaction, then control reaches Block 920. At Block 920, the transaction management system executes a database query (or other data store retrieval command) in accordance with known techniques to retrieve the requested object from the database or data store in which it resides. (Note that data caching could be used with the present invention, possibly avoiding the need to access the persistent store.)

At Block 925, a version of the object retrieved from the data store is then copied into the view for each ancestor transaction in the transaction hierarchy for the current transaction (including the shared transaction, when this option is implemented). During this copying process, the version status data for each version is set to "state=old", to indicate that the version corresponds to an object that is already stored in the persistent store, and sets "modified=no", "delete=no", and the external synchronization flag to "no". The modification level for each version is set to zero. As described above, Block 930 then adds the object version to the current transaction's view by copying the state value, external synchronization flag, and the modified and delete flags from the parent version, as well as setting the modification level for the child and the modification level it remembers for its parent to the current modification level from the parent. Control then transfers to Block 935, where this newly-copied version in the current transaction's view is returned to the invoking logic.

Figure 10:
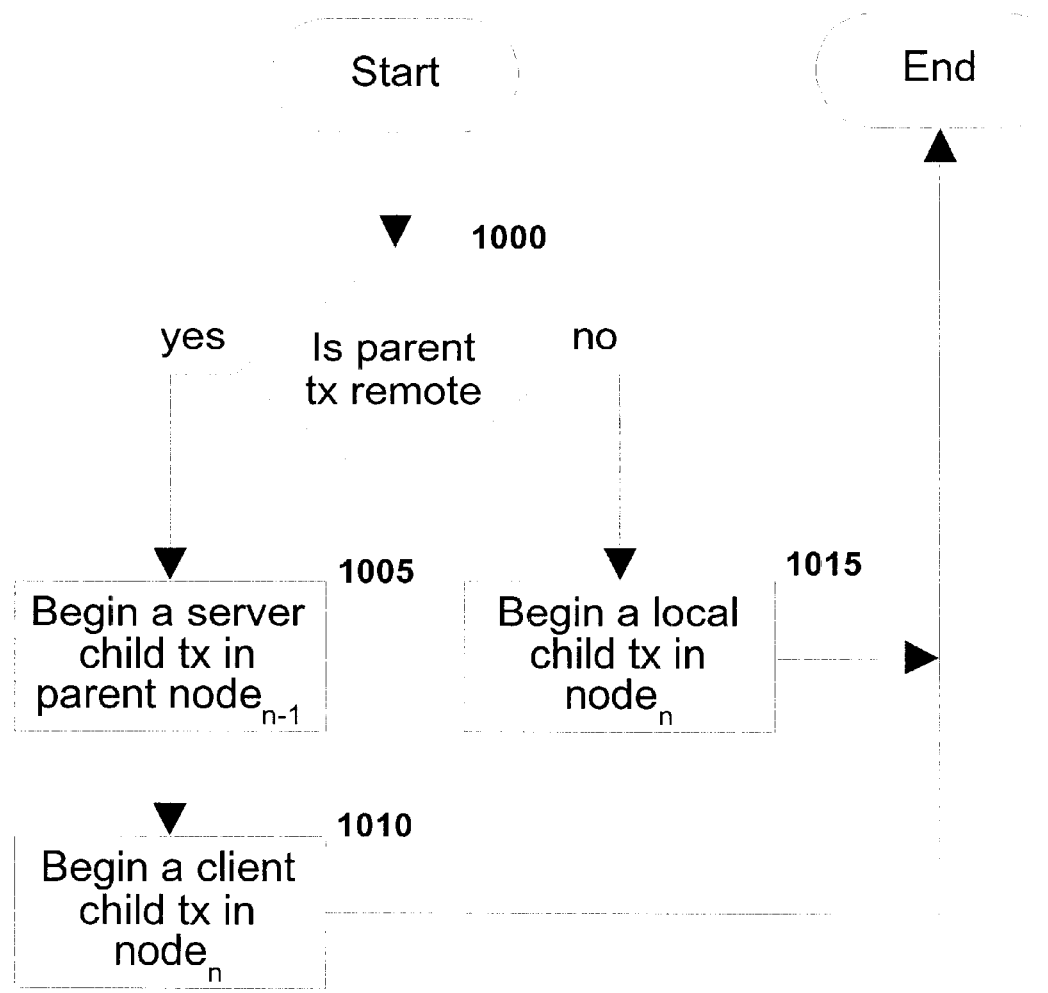

The logic depicted in FIG. 10 is used in the preferred embodiment to begin a child transaction within a particular node referred to as "$nodes_n$". Block 1000 asks whether the parent transaction of this child transaction is remote (that is, whether it spans multiple physical nodes). If not, then Block 1015 begins a child transaction in this node; otherwise, Block 1005 and 1010 create the structure depicted in FIG. 4B. Block 1005 begins the server child transaction in this node's parent, and Block 1010 begins the client child transaction in this node. Beginning a server child transaction (Block 1005) comprises initializing the transaction view in the node containing the server child and refreshing the parent transaction hierarchy (see FIG. 7). Beginning a client child transaction (Block 1010) comprises initializing the transaction view in the node containing the client child, creating a transaction proxy in this node, and refreshing the parent transaction hierarchy. The server transaction is then updated to maintain knowledge of this client child. Beginning a local child transaction (Block 1015) comprises initializing the transaction's view and refreshing the parent transaction hierarchy.

At some point, the application or application user will either decide that (1) the changes made in this transaction or subtransaction are not desired for some reason, and will request that the changes be rolled back, or (2) that the changes made in this transaction or subtransaction should be committed (i.e. saved). These two possibilities are provided for by invoking the logic of FIGS. 11 or FIGS. 12 and 13, respectively. (Alternatively, the logic in these figures may be combined. It will be obvious to one of ordinary skill in the art how to adapt the figures for that approach.).

Figure 11:
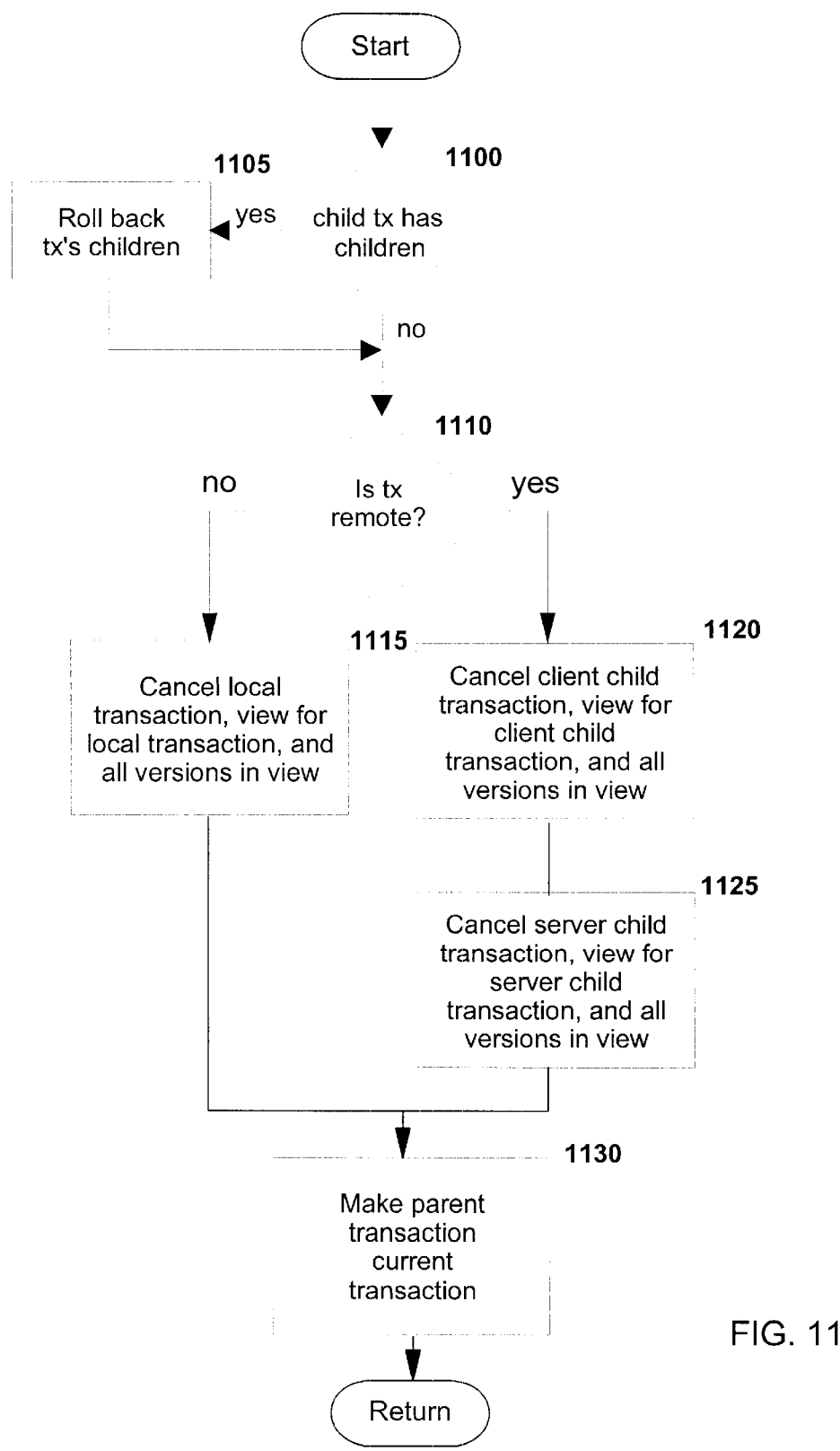

FIG. 11 depicts the logic that is preferably used to implement a roll back process in the present invention. When changes made in a transaction are to be rolled back, the current transaction is to be cancelled, and its view and all versions of any replicated objects (including but not limited to the object that was just updated) are to be discarded. In addition, any child transactions must also be rolled back. Thus, at Block 1100 where a test is made to see if this child transaction has any children (i.e. any subtransactions). If so, the children are rolled back by recursive invocation at Block 1105. When this process completes, or when Block 1100 has a negative result, control transfers to Block 1110. Block 1110 checks to see if this transaction is remote. If not, Block 1115 cancels the current local transaction, and discards its view and versions. If the transaction is remote, Block 1120 cancels the client child transaction in this node and discards its view and versions (as well as cancelling any subtransactions and discarding their views and versions), and Block 1125 cancels the server child transaction in the parent node and discards its view and versions of replicated objects. Following completion of Block 1115 or 1125, the parent of this cancelled transaction is then made to be the current transaction (Block 1130), and processing relative to the rollback of this transaction or subtransaction is ended.

Figure 12:
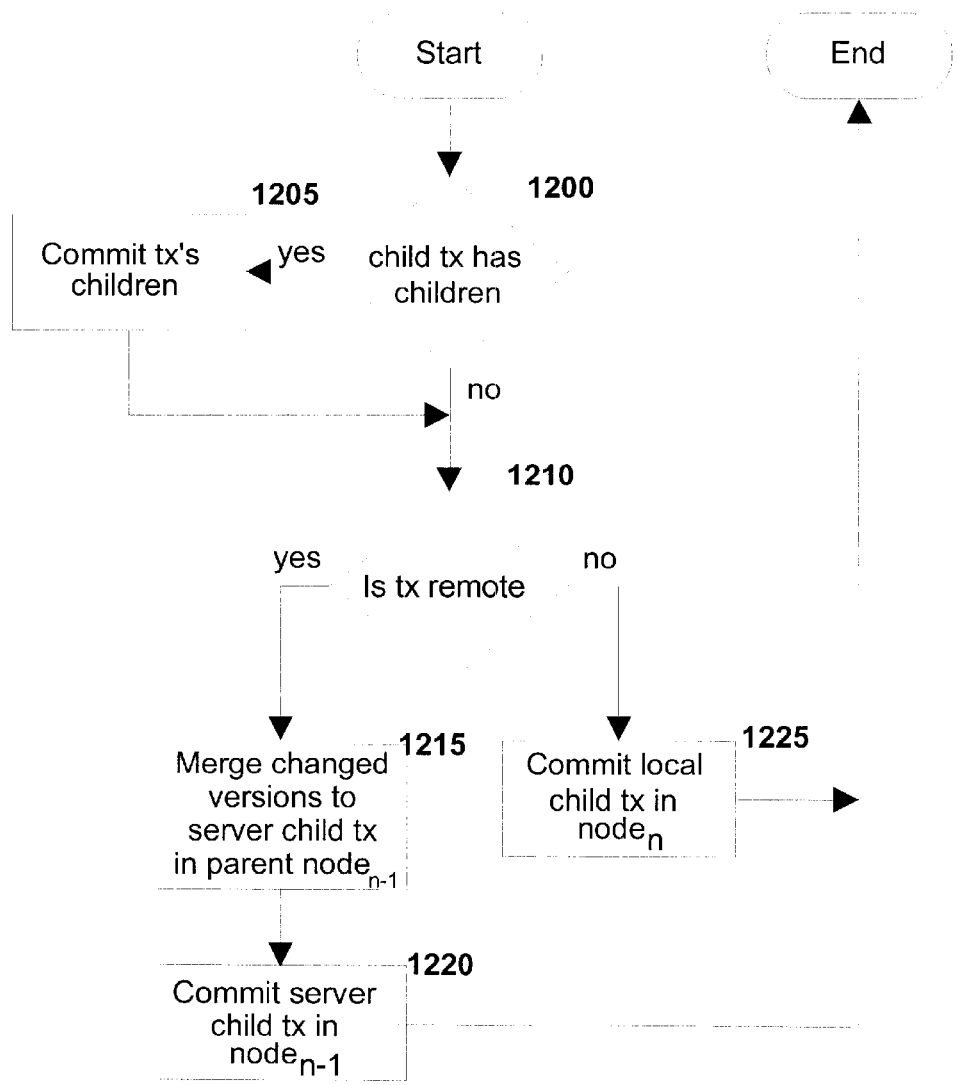
Figure 13:
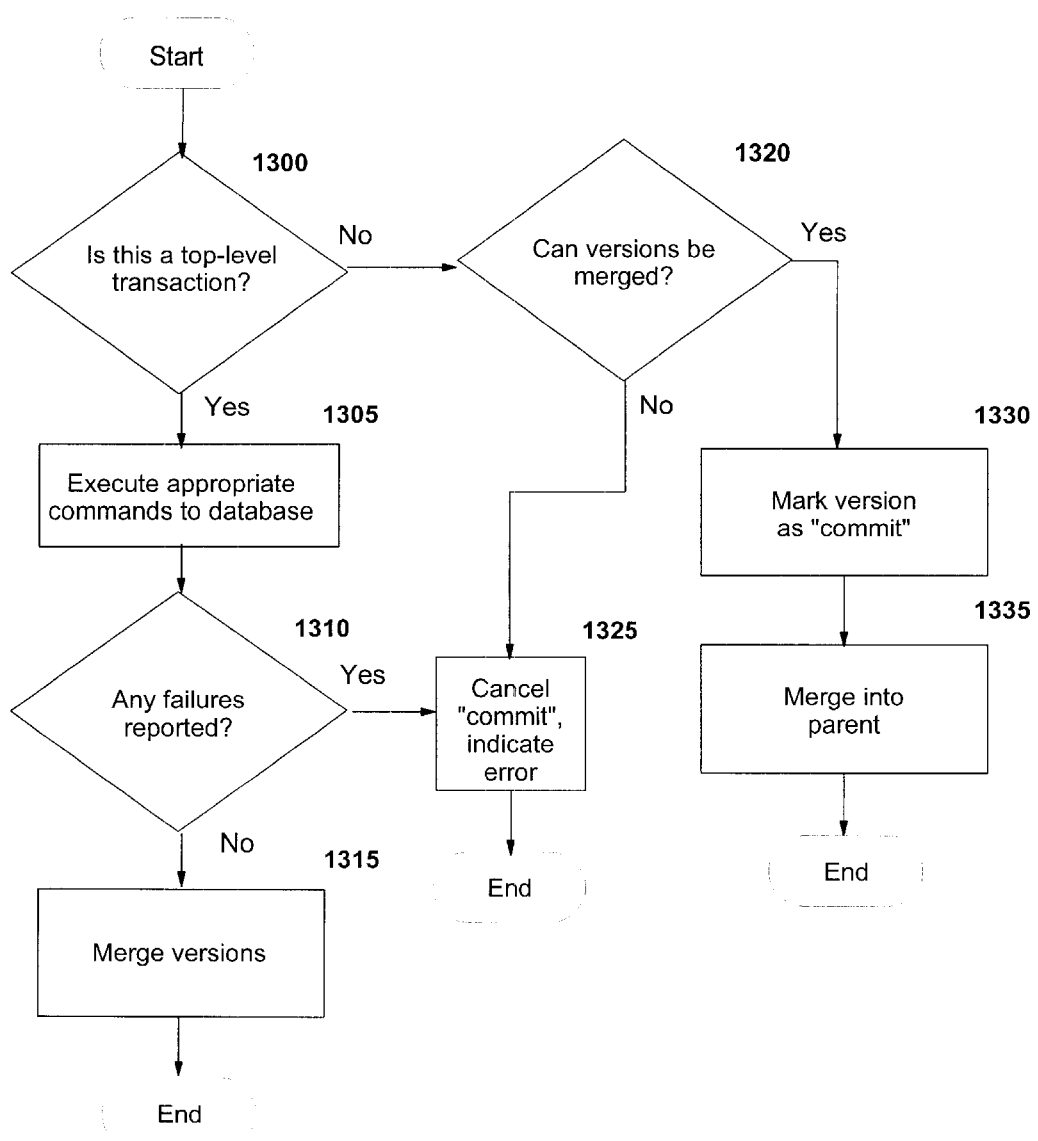

FIGS. 12 and 13 depict the logic that is preferably used to implement a commit process in the present invention. The logic used to commit a child transaction is illustrated in FIG.

12, and begins at Block 1200 where a test is made to see if this child transaction has any children (i.e. any subtransactions). If so, the children are committed by recursive invocation at Block 1205. When this process completes, or when Block 1200 has a negative result, control transfers to Block 1210. Block 1210 asks whether this transaction is remote. If so, Block 1215 merges the changed versions from this client child transaction to the corresponding versions in the view of the server child transaction in this node's parent node. This comprises invoking the logic of FIG. 13 (where Block 1300 will have a negative result when processing the server child transaction). Upon returning from this invocation, Block 1220 issues a commit request against the server child transaction in the parent node, which will cause the logic of FIG. 12 to be re-invoked. Processing of FIG. 12 then ends.

When Block 1210 has a negative result, the local child transaction in this node is committed (Block 1225) by invoking the logic of FIG. 13, after which this commit processing ends.

The logic of FIG. 13 begins by making a determination as to whether this is a top-level transaction (Block 1300). If this test has a negative result, control transfers to Block 1320; otherwise, control transfers to Block 1305.

At Block 1305, the process of committing the changed version to the persistent store begins. For any versions having the "modified" flag set to "no", or the "delete" flag set to "yes" while the state="new", the commit process does not need to be performed. Block 1305 invokes the processing of appropriate database commands to commit the changes to the database (or other persistent store, using commands appropriate for that storage facility). Block 1310 then checks the result of issuing the database command(s), to determine if any failures occurred (such as a negative response to the request, sent by the data store system). If there was a failure of some sort, the commit process is cancelled at Block 1325, and an error condition is returned to the application program for application-dependent processing. If there were no failures detected, then Block 1315 merges the view from the top-level transaction with the view of the shared transaction by overwriting the shared transaction's version of each committed object with the version from the top-level transaction. The top-level transaction's version of any replicated objects is then discarded, as are all the subtransactions and their versions. The changed object is now stored in the persistent store, and the processing for this transaction commit request ends.

Control reaches Block 1320 when the transaction requesting the commit was not a top-level transaction. Therefore, this is a commit request by a child or subtransaction. As stated earlier, subtransaction commits are represented internally to the transaction, by merging the subtransaction's version to that of its parent. The subtransaction's changes are not actually committed to the persistent store until such time as the top-level transaction successfully commits.

It may be possible that the changes made to a replicated object by a subtransaction cannot be merged with the version of that object from its parent in the transaction tree. This is called a data conflict. A merge can be successfully carried out under three conditions: (1) if only the parent version of a replicated object has been modified, (2) if only the child version of the replicated object has been modified, or (3) application-specific logic determines, in the case that both the child and parent have been modified, that a merge can be made safely, and then uses application-specific logic to perform the merge. The modification level described herein, which remembers the modification level that existed in the parent when a child version was created and increments the version's modification level for each change by the version's transaction, is one convenient way in which these conditions can be handled.

Using the modification level technique, conflict detection is implemented by comparing what the child remembers as the parent's modification level to the parent's current modification level. If the child's level is the same as what the child remembers the parent's level to be, then the child has not made changes. This is case (1) above. For this case, no merge of the child to the parent is needed, so there is no conflict. If the parent's current level is the same as what the child remembers for the parent, then the parent has not made changes. This is case (2) above. There is no conflict, and the child can be merged to the parent. If the parent's current level is higher than what the child remembered it as, and the child's version is also higher than this remembered parent level, then the parent and child have both made changes. This is case (3) above. In one aspect of the present invention, a default approach may be used for case (3), where this situation is considered a data conflict (i.e. all conflicts are considered unresolvable) and the merge will simply be rejected. In another aspect, application-specific logic is invoked for case (3) that can further analyze the versions to determine whether the modifications are compatible (i.e. whether the data conflict can be resolved), and thus will not corrupt the data stored in the persistent store. Application-specific logic will then be used to resolve conflicts where they are determined to be compatible, enabling the child's version to be merged into the parent's version. For example, if a child transaction made a change to zip code data in the instance data for a replicated object while the parent transaction made a change to the customer phone number data in the instance data for another version of the same object, application logic can determine if both represent valid values relative to the customer address also in the instance data of this object. For example, if the zip code belongs to an Ohio address while the area code belongs to a North Carolina telephone, there is probably a problem, and the merge would likely be rejected. However, if both the zip code and area code were valid for the same city in Ohio, the merge may be permitted.

When the subtransaction requesting the commit is a flat (leaf) transaction, then the merge checking at Block 1320 is only carried out with respect to the version in the view of the subtransaction and the view of its parent. If the subtransaction is a nested (intermediate) node, then the leaves of each branch from this subtransaction are located in turn, and the commit processing of Blocks 1320 through 1335 is performed from each leaf upward through the tree until the requesting subtransaction is reached. If any conflicts are detected, the merge checking process will return a failure indication in the default case (and the update processing of FIG. 13 will end), or the application-specific conflict resolution process (as described above) will be invoked. When a failure is indicated (either by the default approach, or as a result of the application-specific conflict resolution processing), control will transfer to Block 1325. At Block 1325, the commit process is cancelled and an error is indicated.

If no failures are indicated during commit processing for all the children of the requesting subtransaction, then a merge check is performed with the parent. If the merge check with the parent node indicates a merge will succeed (including the case where application-specific logic determines that any detected conflicts can be merged using application-specific merge processing), i.e. Block 1320 has a positive result, then control transfers to Block 1330. Otherwise, control transfers to Block 1325, where the commit process is cancelled and an error is indicated.

Note that each version in the view is processed during the merge checking, and that the merge checking is not performed for any versions of replicated objects having the modification flag set to "no" in their version status data (because no merge needs to be done when the child has not made changes to an object). Further, when the "delete" flag is set to "yes" and the state is "old", this is treated as a modification so any version having this delete status is also processed during the merge check. (When the delete flag is set to "yes" and the state is "new", this indicates that an object created by the application has been deleted. This is analogous to cancelling the creation, and any version having these flag settings will be ignored.)

At Block 1330, the requesting subtransaction's status is marked as "commit=yes". Once this commit variable has been set, no further changes can be made to the versions in this subtransaction or any of its children.

The version from the requesting subtransaction's view is then merged with the view of its parent at Block 1335. This merge process comprises setting the version status data in the parent to reflect the version status data of the child. If the modification level in the child version is higher than that in the parent version (as it will always be unless the application-specific conflict detection is being used), then the parent's modification level will be set to the level from the child. If the child version has the "delete" flag set to "yes", then this will be copied to the parent's version. When using the default conflict resolution technique discussed earlier, the merge process for the instance data is carried out by overwriting the parent's instance data with that of the child node. When application-specific logic to detect conflicts is being used, then application-specific logic will also be used to resolve the conflicts (i.e to determine which attributes from the child overwrite those of the parent, and which attributes in the parent remain unchanged). In an optional optimization of the preferred embodiment, the child version is not yet discarded, because the changes will not be permanently committed until the top-level transaction commits (or the changes may be rolled back, in the case where some ancestor rolls back). In this optimization, the "modified" flag and the external synchronization flag in the child version are set to "no", indicating that the merge to the parent has completed. Processing of this subtransaction commit request is then complete from this subtransaction's perspective, and the processing of FIG. 13 ends.

The discussions of persistent store herein are in terms of using a "database". However, it is to be understood that this is for ease of reference. Any type of persistent store, however organized (such as a file system), may be used without deviating from the inventive concepts disclosed herein.

In cases where a child transaction's working set is known and can be loaded ahead of time using a read-ahead technique, the client node can operate in a disconnected mode until the commit time. U.S. Pat. No. 6,397,206 (Ser. No. 09/461,954, filed on Dec. 15, 1999) entitled "Optimizing Fixed, Static Query or Service Selection and Execution Based on Working Set Hints and Query Signatures" defines a read-ahead technique that may be used advantageously with the present invention.

The replication technique which has been described herein enables high performance and large scale distribution in distributed object systems. Many replication schemes of the prior art are based on a "checkout" scheme, whereby locks are used while a first requester is granted access to an object in order to prevent access to the same object (with the possibility of inconsistent updates thereto) by any subsequent requesters. In effect, this makes a locked object unavailable. The present invention does not require use of locks, and the undesirable result of unavailable objects which may result when using locks (although locks may be used with the present invention as an alternative to the optimistic conflict resolution technique described above, whereby modification flags and levels are used). The transactions as defined by the present invention may be of long duration, during which time multiple transactions may need to replicate copies of the same objects. Timers may be used with an implementation of the present invention, if desired, to manage transaction duration such that a transaction which has not completed when the timer expires will be automatically rolled back. Typically, these timers should be on the order of minutes or hours, or even possibly days. (In this manner, for example, transactions executing in a workstation that crashes or hangs are less likely to cause problems when trying to commit a parent transaction.)

The present invention has been discussed herein primarily in terms of its use in an enterprise computing environment. However, this is not meant to limit the invention in any way: the invention may be used beneficially in any environment in which remote objects need to be accessed in a distributed object system. Due to the efficiency, scalability, and relatively light-weight nature of this technique, it may be advantageously used in applications ranging from small handheld devices such as PDAs (Personal Digital Assistants) to large enterprise servers. Without this technique, distributed object systems cannot fulfill the object model granularity and system performance requirements necessary for a competitive solution in today's computing environments.

While the present invention has been described relative to managing a persistent store of objects using Java programming, the basic techniques described herein may be applicable to many types of object-oriented languages. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. A computer program product for improving performance in a distributed object system, said computer program product embodied on a computer readable medium and comprising:

computer-readable program code means for creating a tree structure to represent one or more subtransactions of one or more concurrent and/or nested transactions which may access one or more objects stored at a remote persistent object store in said distributed object system, wherein each node of said tree structure maintains an independent view comprising a version of each object available at said node;

computer-readable program code means for requesting, by a selected one of said subtransactions, access to a selected one of said stored objects;

computer-readable program code means for determining whether said selected object is available in a particular independent view maintained by a node in which said selected subtransaction is executing;

computer-readable program code means for obtaining a version of said selected object and making said obtained version available to said particular independent view when said computer-readable program code means for determining has a negative result;

computer-readable program code means for temporarily making one or more modifications to said selected object, said modifications requested by said selected subtransaction, by making said modifications to said particular independent view of said selected subtransaction;

computer-readable program code means for committing said modifications upon a commit request; and computer-readable program code means for performing a rollback of said modifications upon a rollback request.

2. The computer program product according to claim 1, wherein said computer-readable program code means for obtaining a version of said selected object and making said obtained version available further comprises:

computer-readable program code means for checking whether said selected subtransaction is a remote transaction;

computer-readable program code means for copying said version of said selected object from an ancestor node when said computer-readable program code means for checking has a negative result; and computer-readable program code means for replicating said version of said selected object from a remote parent node when said computer-readable program code means for checking has a positive result.

3. The computer program product according to claim 2, wherein said computer-readable program code means for copying further comprises:

computer-readable program code means for retrieving said selected object from said remote persistent object store when said selected object is not available in said independent view of any ancestor node of said selected subtransaction in said tree structure, thereby making said selected object available from said independent view of a particular one of said ancestor nodes;

computer-readable program code means for copying said selected object down through said tree structure to said selected subtransaction from said independent view of said ancestor node in which said selected object is available; and computer-readable program code means for adding said retrieved object to said particular independent view of said selected subtransaction.

4. The computer program product according to claim 2, wherein said computer-readable program code means for replicating further comprises:

computer-readable program code means for retrieving said selected object from said remote persistent object store when said selected object is not available in said independent view of said remote parent node or said independent view of any ancestor node of said selected subtransaction in said tree structure, thereby making said selected object available from said independent view of a particular one of said ancestor nodes;

computer-readable program code means for copying said selected object down through said tree structure to said remote parent node of said selected subtransaction from said independent view of said ancestor in which said selected object is available;

computer-readable program code means for rendering said selected object into a portable format at said remote parent node;

computer-readable program code means for transmitting said portable format from said remote parent node to said node in which said selected subtransaction is executing;

computer-readable program code means for receiving said transmitted portable format and reconstituting said selected object from said portable format at said node in which said selected subtransaction is executing; and computer-readable program code means for adding said reconstituted selected object to said particular independent view of said selected subtransaction.

5. The computer program product according to claim 1, wherein said computer-readable program code means for committing further comprises:

computer-readable program code means for use when said subtransaction is not a top-level transaction in a transaction tree, comprising:

computer-readable program code means for attempting to merge said modifications to said parent of said subtransaction upon said request to commit said modifications;

computer-readable program code means for cancelling said commit request if said computer-readable program code means for attempting detects one or more unresolvable data conflicts with one or more separate modifications made to said selected object, wherein said separate modifications are stored by said parent in said independent view of said parent;

computer-readable program code means for performing said merge of said modifications to said independent view of said parent if said computer-readable program code means for attempting does not detect any of said unresolvable data conflicts; and computer-readable program code means for committing said merged modifications to said independent view of said parent; and computer-readable program code means for use when said subtransaction is said top-level transaction in said transaction tree, comprising:

computer-readable program code means for committing said modifications with a copy of said selected object in said remote persistent object store;

computer-readable program code means for merging said modifications to a global transaction if said computer-readable program code means for committing does not detect an error condition; and computer-readable program code means for discarding said top-level transaction and any subtransactions related to said top-level transaction in said transaction tree.

6. The computer program product according to claim 1, wherein said computer-readable program code means for committing further comprises:

computer-readable program code means for use when said subtransaction is not a top-level transaction in a transaction tree, comprising:

computer-readable program code means for attempting to merge said modifications to said parent of said subtransaction upon a request to commit said modifications;

computer-readable program code means for cancelling said commit request if said computer-readable program code means for attempting detects one or more unresolvable data conflicts with one or more separate modifications made to said selected object, wherein said separate modifications are stored by said parent in said independent view of said parent;

computer-readable program code means for performing said merge of said modifications to said independent view of said parent if said computer-readable program code means for attempting does not detect any of said unresolvable data conflicts; and computer-readable program code means for committing said merged modifications to said independent view of said parent; and computer-readable program code means for use when said subtransaction is said top-level transaction in said transaction tree, comprising:

computer-readable program code means for committing said modifications with a copy of said selected object in said remote persistent object store; and computer-readable program code means for discarding said top-level transaction and any subtransactions related to said top-level transaction in said transaction tree.

7. The computer program product according to claim 5, wherein said computer-readable program code means for attempting further comprises invoking application-specific logic to determine when said separate modifications indicate that one of said unresolvable data conflicts is found and said computer-readable program code means for merging further comprises invoking application-specific logic to resolve any resolvable data conflicts.

8. The computer program product according to claim 5, wherein said computer-readable program code means for attempting further comprises computer-readable program code means for determining that no unresolvable data conflict will occur if one of an object version from a child transaction and a parent transaction which are to be merged has not been modified or where both of the object versions have been modified from the child transaction and the parent transaction, logic is applied that determines that the object versions can be successfully merged; and wherein said computer-readable program code means for performing said merging further comprises computer-readable program code means for invoking application-specific logic to resolve any resolvable data conflicts.

9. A system for improving performance in a distributed object system, comprising:

means for creating a tree structure to represent one or more subtransactions of one or more concurrent and/or nested transactions which may access one or more objects stored at a remote persistent object store in said distributed object system, wherein each node of said tree structure maintains an independent view comprising a version of each object available at said node;

means for requesting, by a selected one of said subtransactions, access to a selected one of said stored objects;

means for determining whether said selected object is available in a particular independent view maintained by a node in which said selected subtransaction is executing;

means for obtaining a version of said selected object and making said obtained version a available to said particular independent view when said means for determining has a negative result;

means for temporarily making one or more modifications to said selected object, said modifications requested by said selected subtransaction, by making said modifications to said particular independent view of said selected subtransaction;

means for committing said modifications upon a commit request; and means for performing a rollback of said modifications upon a rollback request.

10. The system according to claim 9, wherein said means for obtaining a version of said selected object and making said obtained version available further comprises:

means for checking whether said selected subtransaction is a remote transaction;

means for copying said version of said selected object from an ancestor node when said means for checking has a negative result; and means for replicating said version of said selected object from a remote parent node when said means for checking has a positive result.

11. The system according to claim 10, wherein said means for copying further comprises:

means for retrieving said selected object from said remote persistent object store when said selected object is not available in said independent view of any ancestor node of said selected subtransaction in said tree structure, thereby making said selected object available from said independent view of a particular one of said ancestor nodes;

means for copying said selected object down through said tree structure to said selected subtransaction from said independent view of said ancestor node in which said selected object is available; and means for adding said retrieved object to said particular independent view of said selected subtransaction.

12. The system according to claim 10, wherein said means for replicating further comprises:

means for retrieving said selected object from said remote persistent object store when said selected object is not available in said independent view of said remote parent node or said independent view of any ancestor node of said selected subtransaction in said tree structure, thereby making said selected object available from said independent view of a particular one of said ancestor nodes;

means for copying said selected object down through said tree structure to said remote parent node of said selected subtransaction from said independent view of said ancestor in which said selected object is available;

means for rendering said selected object into a portable format at said remote parent node;

means for transmitting said portable format from said remote parent node to said node in which said selected subtransaction is executing;

means for receiving said transmitted portable format and reconstituting said selected object from said portable format at said node in which said selected subtransaction is executing; and means for adding said reconstituted selected object to said particular independent view of said selected subtransaction.

13. The system according to claim 9, wherein said means for committing further comprises:

means for use when said subtransaction is not a top-level transaction in a transaction tree, comprising:

means for attempting to merge said modifications to said parent of said subtransaction upon said request to commit said modifications;

means for cancelling said commit request if said means for attempting detects one or more unresolvable data conflicts with one or more separate modifications made to said selected object, wherein said separate modifications are stored by said parent in said independent view of said parent;

means for performing said merge of said modifications to said independent view of said parent if said means for attempting does not detect any of said unresolvable data conflicts; and means for committing said merged modifications to said independent view of said parent; and means for use when said subtransaction is said top-level transaction in said transaction tree, comprising:

means for committing said modifications with a copy of said selected object in said remote persistent object store;

means for merging said modifications to a global transaction if said means for committing does not detect an error condition; and means for discarding said top-level transaction and any subtransactions related to said top-level transaction in said transaction tree.

14. The system according to claim 9, wherein said means for committing further comprises:

means for use when said subtransaction is not a top-level transaction in a transaction tree, comprising:

means for attempting to merge said modifications to said parent of said subtransaction upon a request to commit said modifications;

means for cancelling said commit request if said means for attempting detects one or more unresolvable data conflicts with one or more separate modifications made to said selected object, wherein said separate modifications are stored by said parent in said independent view of said parent;

means for performing said merge of said modifications to said independent view of said parent if said means for attempting does not detect any of said unresolvable data conflicts; and means for committing said merged modifications to said independent view of said parent; and means for use when said subtransaction is said top-level transaction in said transaction tree, comprising:

means for committing said modifications with a copy of said selected object in said remote persistent object store; and means for discarding said top-level transaction and any subtransactions related to said top-level transaction in said transaction tree.

15. The system according to claim 13, wherein said means for attempting further comprises invoking application-specific logic to determine when said separate modifications indicate that one of said unresolvable data conflicts is found and said means for merging further comprises invoking application-specific logic to resolve any resolvable data conflicts.

16. The system according to claim 13, wherein said means for attempting further comprises means for determining that no unresolvable data conflict will occur if one of an object version from a child transaction and a parent transaction which are to be merged has not been modified or where both of the object versions have been modified from the child transaction and the parent transaction, logic is applied that determines that the object versions can be successfully merged; and wherein said means for performing said merging further comprises means for invoking application-specific logic to resolve any resolvable data conflicts.

17. A method for improving performance in a distributed object system, comprising the steps of:

creating a tree structure to represent one or more subtransactions of one or more concurrent and/or nested transactions which may access one or more objects stored at a remote persistent object store in said distributed object system, wherein each node of said tree structure maintains an independent view comprising a version of each object available at said node;

requesting, by a selected one of said subtransactions, access to a selected one of said stored objects;

determining whether said selected object is available in a particular independent view maintained by a node in which said selected subtransaction is executing;

obtaining a version of said selected object and making said obtained version available to said particular independent view when said determining step has a negative result;

temporarily making one or more modifications to said selected object, said modifications requested by said selected subtransaction, by making said modifications to said particular independent view of said selected subtransaction;

committing said modifications upon a commit request; and performing a rollback of said modifications upon a rollback request.

18. The method according to claim 17, wherein said step of obtaining a version of said selected object and making said obtained version available further comprises the steps of:

checking whether said selected subtransaction is a remote transaction;

copying said version of said selected object from an ancestor node when said checking step has a negative result; and replicating said version of said selected object from a remote parent node when said checking step has a positive result.

19. The method according to claim 18, wherein said copying step further comprises the steps of:

retrieving said selected object from said remote persistent object store when said selected object is not available in said independent view of any ancestor node of said selected subtransaction in said tree structure, thereby making said selected object available from said independent view of a particular one of said ancestor nodes;

copying said selected object down through said tree structure to said selected subtransaction from said independent view of said ancestor node in which said selected object is available; and adding said retrieved object to said particular independent view of said selected subtransaction.

20. The method according to claim 18, wherein said replicating step further comprises the steps of:

retrieving said selected object from said remote persistent object store when said selected object is not available in said independent view of said remote parent node or said independent view of any ancestor node of said selected subtransaction in said tree structure, thereby making said selected object available from said independent view of a particular one of said ancestor nodes;

copying said selected object down through said tree structure to said remote parent node of said selected subtransaction from said independent view of said ancestor in which said selected object is available;

rendering said selected object into a portable format at said remote parent node;

transmitting said portable format from said remote parent node to said node in which said selected subtransaction is executing;

receiving said transmitted portable format and reconstituting said selected object from said portable format at said node in which said selected subtransaction is executing; and adding said reconstituted selected object to said particular independent view of said selected subtransaction.

21. The method according to claim 17, wherein said committing step further comprises the steps of:

performing a commit when said subtransaction is not a top-level transaction in a transaction tree, comprising the steps of:

attempting to merge said modifications to said parent of said subtransaction upon said request to commit said modifications;

cancelling said commit request if said attempting step detects one or more unresolvable data conflicts with one or more separate modifications made to said selected object, wherein said separate modifications are stored by said parent in said independent view of said parent;

performing said merge of said modifications to said independent view of said parent if said attempting step does not detect any of said unresolvable data conflicts; and committing said merged modifications to said independent view of said parent; and performing said commit when said subtransaction is said top-level transaction in said transaction tree, comprising the steps of:

committing said modifications with a copy of said selected object in said remote persistent object store;

merging said modifications to a global transaction if said committing step does not detect an error condition; and discarding said top-level transaction and any subtransactions related to said top-level transaction in said transaction tree.

22. The method according to claim 17, wherein said committing step further comprises the steps of:

performing a commit when said subtransaction is not a top-level transaction in a transaction tree, comprising the steps of:

attempting to merge said modifications to said parent of said subtransaction upon a request to commit said modifications;

cancelling said commit request if said attempting step detects one or more unresolvable data conflicts with one or more separate modifications made to said selected object, wherein said separate modifications are stored by said parent in said independent view of said parent;

performing said merge of said modifications to said independent view of said parent if said attempting step does not detect any of said unresolvable data conflicts; and committing said merged modifications to said independent view of said parent; and performing said commit when said subtransaction is said top-level transaction in said transaction tree, comprising the steps of:

committing said modifications with a copy of said selected object in said remote persistent object store; and discarding said top-level transaction and any subtransactions related to said top-level transaction in said transaction tree.

23. The method according to claim 21, wherein said attempting step further comprises the step of invoking application-specific logic to determine when said separate modifications indicate that one of said unresolvable data conflicts is found and said merging step further comprises the step of invoking application-specific logic to resolve any resolvable data conflicts.

24. The method according to claim 21, wherein said attempting step further comprises the step of determining that no unresolvable data conflict will occur if one of an object version from a child transaction and a parent transaction which are to be merged has not been modified or where both of the object versions have been modified from the child transaction and the parent transaction, logic is applied that determines that the object versions can be successfully merged; and wherein said step of performing said merging further comprises the step of invoking application-specific logic to resolve any resolvable data conflicts.

* * * * *